United States Patent
Inoue et al.

(10) Patent No.: US 10,205,156 B2
(45) Date of Patent: Feb. 12, 2019

(54) SECONDARY BATTERY

(71) Applicant: SEMICONDUCTOR ENERGY LABORATORY CO., LTD., Atsugi-shi, Kanagawa-ken (JP)

(72) Inventors: Nobuhiro Inoue, Kanagawa (JP); Ryota Tajima, Kanagawa (JP); Naoki Kurihara, Kanagawa (JP); Junpei Momo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 627 days.

(21) Appl. No.: 14/494,898

(22) Filed: Sep. 24, 2014

(65) Prior Publication Data

US 2015/0086868 A1   Mar. 26, 2015

(30) Foreign Application Priority Data

Sep. 26, 2013   (JP) .................................. 2013-200013
Oct. 9, 2013   (JP) .................................. 2013-211589

(51) Int. Cl.
  *H01M 4/134*   (2010.01)
  *H01M 4/36*   (2006.01)
  (Continued)

(52) U.S. Cl.
  CPC ............. *H01M 4/134* (2013.01); *H01M 4/38* (2013.01); *H01M 4/622* (2013.01); *H01M 4/625* (2013.01);
  (Continued)

(58) Field of Classification Search
  CPC .... H01M 2/168; H01M 10/0525; H01M 4/13; H01M 4/134; H01M 4/1395; H01M 4/38; H01M 4/386; H01M 4/387; H01M 4/40
  See application file for complete search history.

(56) References Cited

U.S. PATENT DOCUMENTS 7,632,607 B2   12/2009   Ugaji et al.
8,835,048 B2   9/2014   Kuriki et al.
(Continued)

FOREIGN PATENT DOCUMENTS

EP   1562250 A   8/2005
EP   1677375 A   7/2006
(Continued)

*Primary Examiner* — Ula C Ruddock
*Assistant Examiner* — Amanda J Barrow
(74) *Attorney, Agent, or Firm* — Nixon Peabody LLP; Jeffrey L. Costellia

(57) ABSTRACT

An object of one embodiment of the present invention is to provide a secondary battery in which deterioration of charge-discharge cycle characteristics is suppressed, to suppress generation of defects caused by expansion and contraction of an active material in a negative electrode, or to prevent deterioration caused by deformation of a secondary battery. To prevent deterioration, a material that can be alloyed with lithium and fluidified easily is used for a negative electrode. To hold a negative electrode active material over a surface of a current collector, a covering layer that covers the negative electrode active material is provided. Furthermore, a portion where the current collector and the negative electrode active material are in contact with each other is alloyed. In other words, an alloy that is in contact with both the current collector and the negative electrode active material is provided in the negative electrode.

22 Claims, 24 Drawing Sheets

(51) Int. Cl.
  *H01M 4/62*    (2006.01)
  *H01M 4/38*    (2006.01)
  *H01M 4/66*    (2006.01)
  *H01M 10/052*  (2010.01)
  H01M 2/10     (2006.01)
  H01M 10/42    (2006.01)
  H01M 10/48    (2006.01)

(52) U.S. Cl.
  CPC ......... *H01M 4/626* (2013.01); *H01M 4/661* (2013.01); *H01M 10/052* (2013.01); *H01M 2/1094* (2013.01); *H01M 4/366* (2013.01); *H01M 10/4257* (2013.01); *H01M 10/48* (2013.01); *H01M 10/488* (2013.01); *H01M 2010/4278* (2013.01); *H01M 2220/20* (2013.01); *H01M 2220/30* (2013.01); *Y02E 60/122* (2013.01)

(56) References Cited

U.S. PATENT DOCUMENTS

| | | |
|---|---|---|
| 9,425,441 B2 | 8/2016 | Konishiike et al. |
| 2003/0027050 A1* | 2/2003 | Okamoto ............. H01M 4/13 429/231.95 |
| 2004/0058249 A1* | 3/2004 | Cai ..................... H01M 8/0221 429/248 |
| 2005/0079421 A1* | 4/2005 | Konishiike ........... H01M 4/13 429/231.95 |
| 2006/0127773 A1* | 6/2006 | Kawakami ........... H01M 4/134 429/245 |
| 2006/0133980 A1* | 6/2006 | Nanba ................. H01M 4/133 423/445 R |
| 2007/0026291 A1* | 2/2007 | Kim .................... H01M 8/1006 429/483 |
| 2007/0069159 A1* | 3/2007 | Banine ................ H05G 2/005 250/493.1 |
| 2007/0190415 A1* | 8/2007 | Sung .................... H01M 4/38 429/218.1 |
| 2011/0171525 A1* | 7/2011 | Abe ..................... H01M 4/623 429/212 |
| 2011/0305950 A1 | 12/2011 | Kuriki et al. |
| 2012/0171567 A1* | 7/2012 | Obika .................. H01M 2/08 429/210 |
| 2013/0323585 A1 | 12/2013 | Inoue et al. |
| 2014/0127566 A1 | 5/2014 | Kuriki et al. |
| 2014/0127567 A1 | 5/2014 | Kuriki et al. |

FOREIGN PATENT DOCUMENTS

| | | | |
|---|---|---|---|
| JP | 08-329929 A | 12/1996 | |
| JP | 09-245799 A | 9/1997 | |
| JP | 2001-250543 A | 9/2001 | |
| JP | 2004-171875 A | 6/2004 | |
| JP | 2005-216601 A | 8/2005 | |
| JP | 2011-198494 | * 10/2011 | ......... H01M 10/058 |
| JP | 2012-018909 A | 1/2012 | |
| JP | 2012-018919 A | 1/2012 | |
| WO | WO-2006/043470 | 4/2006 | |

* cited by examiner

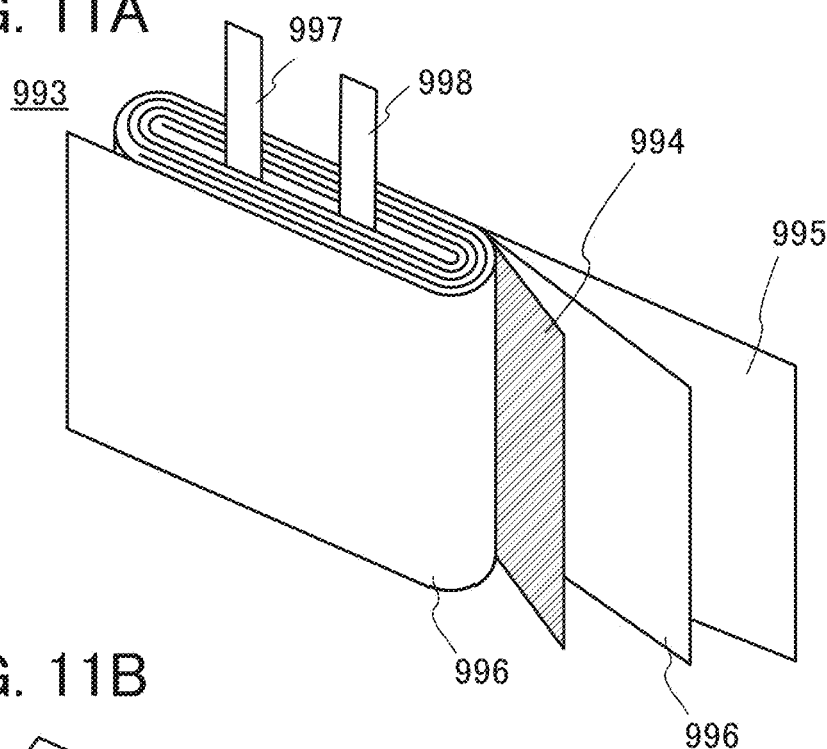
FIG. 11A
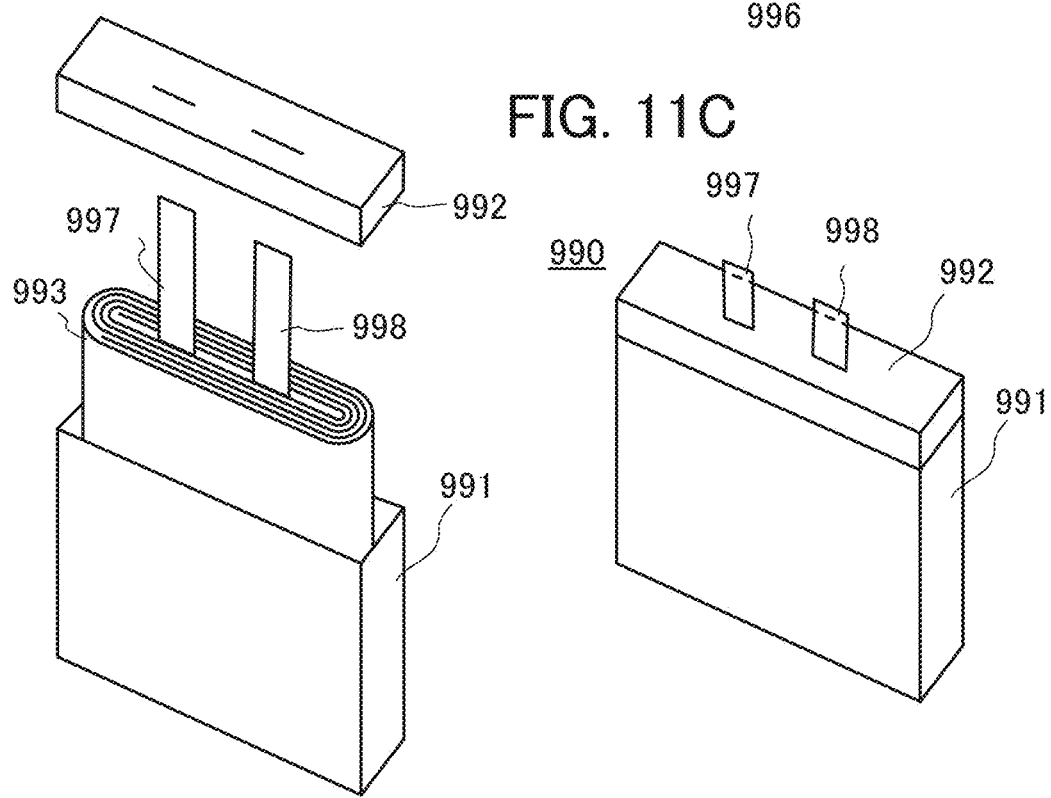
FIG. 11B
FIG. 11C

FIG. 13A1 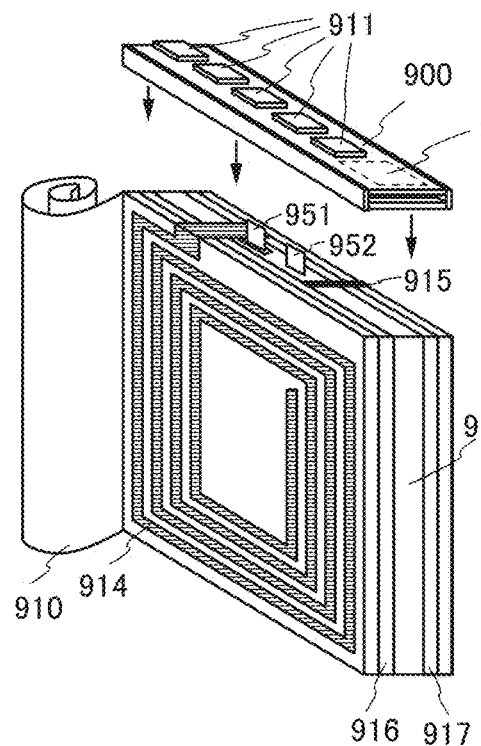
FIG. 13A2 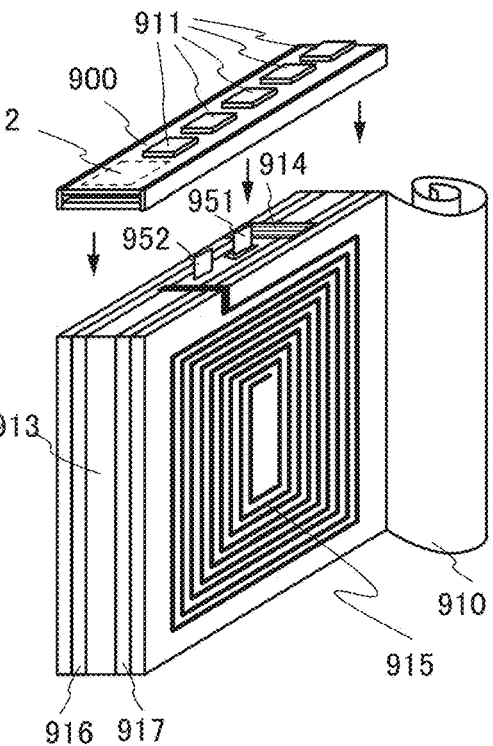
FIG. 13B1 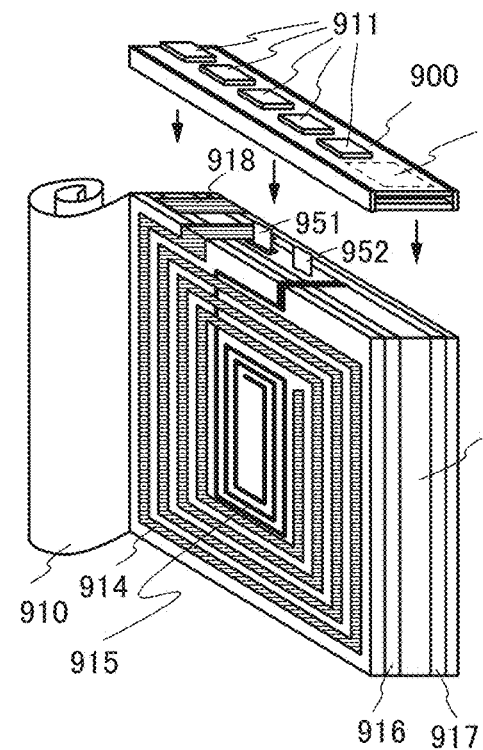
FIG. 13B2 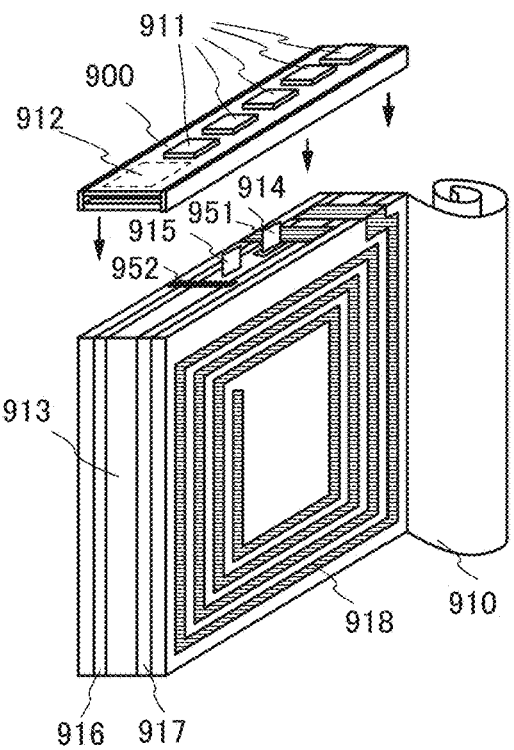

SECONDARY BATTERY

BACKGROUND OF THE INVENTION

1. Field of the Invention

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a secondary battery and a method for manufacturing the secondary battery. In particular, one embodiment of the present invention relates to an electrode of a lithium-ion secondary battery.

2. Description of the Related Art

Examples of a secondary battery capable of being charged and discharged include a nickel-metal hydride secondary battery and a lithium-ion secondary battery.

Such secondary batteries are often used as power sources in portable information terminals typified by mobile phones. In particular, lithium-ion secondary batteries have been actively developed because capacity thereof can be increased and size thereof can be reduced.

An electrode functioning as a positive electrode or a negative electrode of a lithium-ion secondary battery is formed with, for example, a lithium metal, a carbon-based material, or an alloy material. A lithium-ion secondary battery in which a group of whiskers including silicon is used for an electrode has been disclosed in Patent Document 1.

REFERENCE

Patent Document

[Patent Document 1] Japanese Published Patent Application No. 2012-018919

SUMMARY OF THE INVENTION

To achieve high capacitance secondary batteries, negative electrodes using silicon have been actively developed. However, when silicon is used for a negative electrode, repeated charge and discharge cause repeated expansion and contraction; as a result, contacts between active materials are gradually reduced. Moreover, the repeated expansion and contraction might cause separation between a current collector and an active material. Thus, the repeated expansion and contraction of the active material cause deterioration in characteristics of a secondary battery (e.g., charge-discharge cycle characteristics).

The problem of expansion and contraction can occur not only when silicon is used for a negative electrode but also when another high capacitance material is used for a negative electrode.

An object of one embodiment of the present invention is to provide a secondary battery in which deterioration of charge-discharge cycle characteristics is suppressed. Another object is to suppress generation of defects caused by expansion and contraction of an active material in a negative electrode. Another object is to provide a novel negative electrode material. Another object is to provide a novel electrode. Another object is to provide a novel power storage device. Another object is to provide a novel secondary battery.

In the case where a secondary battery is used in a flexible display device, a flexible electronic device, or the like, when the secondary battery is provided in a flexible part (part or the whole of a housing) and bent together with the flexible part, repeated deformation (bending) of the secondary battery might cause separation between a current collector and an active material in the secondary battery, so that deterioration of the secondary battery might be promoted.

Another object of one embodiment of the present invention is to prevent deterioration of a secondary battery caused by deformation of the secondary battery.

Note that the description of these objects does not impede the existence of other objects. In one embodiment of the present invention, there is no need to achieve all the above objects. Other objects will be apparent from and can be derived from the description of the specification, the drawings, the claims, and the like.

To prevent deterioration caused by expansion and contraction of an active material or deformation (e.g., bending), a material that can be alloyed with lithium and fluidified easily is used for a negative electrode. For example, a current collector and a negative electrode active material are used for the negative electrode, a low melting point material typified by gallium (melting point: 29.7° C.) is used as a material of the negative electrode active material. Furthermore, to hold the negative electrode active material over a surface of the current collector, a covering layer that covers the negative electrode active material is provided. Thus, even when the negative electrode active material expands or contracts or an external force that causes separation between the negative electrode active material and the current collector is applied, the negative electrode active material is prevented from being separated from the current collector and not contributing to charge and discharge; therefore, deterioration of characteristics of a secondary battery can be suppressed.

Furthermore, a portion where the current collector and the negative electrode active material are in contact is alloyed; in other words, an alloy that is in contact with both the current collector and the negative electrode active material is provided in the negative electrode. Thus, adhesion between the negative electrode active material and the current collector is improved and the negative electrode active material is held easily over the surface of the current collector.

One embodiment of the present invention is a secondary battery including a positive electrode and a negative electrode. The negative electrode includes a current collector; a negative electrode active material layer including a negative electrode active material containing a metal or alloy whose melting point is 250° C. or lower; and a covering layer covering the negative electrode active material.

Another embodiment of the present invention is a secondary battery including a positive electrode and a negative electrode. The negative electrode includes a current collector, a covering layer, and a negative electrode active material layer. The negative electrode active material layer includes a negative electrode active material and a conductive additive. The negative electrode active material contains a metal or alloy whose melting point is 250° C. or lower, and is in contact with the current collector or the conductive additive. The covering layer covers the negative electrode active material that is in contact with the current collector or the conductive additive.

The negative electrode active material preferably contains gallium.

The covering layer preferably contains a resin or a carbon fiber.

The negative electrode active material layer preferably contains a resin and a carbon fiber.

The negative electrode preferably contains an alloy that is in contact with both the current collector and the negative electrode active material. The alloy preferably contains a metal element contained in the current collector and a metal element contained in the negative electrode active material.

The current collector preferably contains copper.

The negative electrode active material layer preferably contains a metal flake (flake powder). The size of the metal flake is preferably more than 10 μm and 50 μm or less. In that case, the metal flake preferably contains copper.

Another embodiment of the present invention is a secondary battery including a positive electrode and a negative electrode. The negative electrode includes a current collector, a negative electrode active material layer containing gallium, and an alloy that is in contact with both the current collector and gallium contained in the negative electrode active material layer. The alloy contains gallium and a metal element contained in the current collector.

A fiber conductive additive such as a vapor-grown carbon fiber (VGCF) is preferably mixed in the negative electrode active material layer. The fiber conductive additive has a function of bonding the negative electrode active materials, which suppresses deterioration of a battery. The VGCF also functions as a structure body or cushioning for keeping the shape of the negative electrode active material layer. Since the VGCF functions as a structure body or cushioning for keeping the shape of the negative electrode active material layer, separation between the current collector and the active material is less likely to occur when a secondary battery is bent.

Although carbon black such as acetylene black or ketjen black may be used instead of VGCF, it is preferable to use VGCF because the strength for keeping the shape of the negative electrode active material layer can be increased. When the strength for keeping the shape of the negative electrode active material layer is high, deterioration of the secondary battery caused by deformation (e.g., bending) can be prevented.

To achieve a negative electrode that easily occludes lithium ions, a copper flake is mixed and alloyed with gallium.

Another embodiment of the present invention is a secondary battery including a positive electrode and a negative electrode. The negative electrode includes a current collector, a negative electrode active material layer containing gallium, a copper flake, a resin, and a carbon fiber.

In the above structure, the negative electrode includes a first alloy that is in contact with both the copper flake and gallium, so that the negative electrode can easily occlude lithium ions. Furthermore, the negative electrode includes a second alloy that is in contact with both the current collector and gallium, so that the negative electrode active material is held over a surface of the current collector. The composition of the first alloy may be the same as that of the second alloy. Alternatively, the composition of the first alloy may be different from that of the second alloy by using different materials for the first alloy and the second alloy.

In each of the above structures, the current collector of the negative electrode is, for example, a metal foil containing copper as its main component. This foil is preferable because copper and gallium can be alloyed by heat treatment at a temperature of approximately 120° C. A material having the lowest heat resistance among materials of the negative electrode is a resin. In the case where alloying occurs at 120° C., a resin whose upper temperature limit is higher than 120° C. is used. Therefore, when a resin material having high heat resistance is used, materials which form an alloy are not limited to copper and gallium.

For example, instead of gallium, tin (Sn) may be used as the negative electrode active material. In that case, an alloy of tin and copper is used as the alloy.

A method of manufacturing a secondary battery having high energy density and showing less deterioration is also one embodiment of the present invention. In the manufacturing method, slurry containing copper and gallium is applied to the current collector and heat treatment is performed, so that an alloy is formed.

In the manufacturing method, copper is a flake (flake powder).

In the manufacturing method, the slurry contains a carbon fiber. In that case, the slurry contains, copper, gallium, a solvent, and a resin (e.g., a binder resin) in addition to the carbon fiber. Examples of the binder resin include polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVDF).

In the manufacturing method, by the heat treatment, the solvent contained in the slurry is vaporized, and gallium and copper are alloyed. It is preferable to perform vaporization and alloying at the same time by one time heat treatment because the number of manufacturing steps can be reduced. Alternatively, first heat treatment for vaporization may be performed and then second heat treatment for alloying may be performed. Note that the process temperature in the second heat treatment is set higher than the process temperature in the first heat treatment temperature and lower than or equal to the upper temperature limit of the resin contained in the slurry.

One embodiment of the present invention can provide a secondary battery in which deterioration of charge-discharge cycle characteristics is suppressed. In one embodiment of the present invention, generation of defects due to expansion and contraction of an active material in a negative electrode can be suppressed. One embodiment of the present invention can provide a novel negative electrode material or a novel secondary battery. One embodiment of the present invention can provide a novel electrode or a novel power storage device or the like. In one embodiment of the present invention, deterioration of a secondary battery due to deformation can be prevented. Note that the description of these effects does not impede the existence of other effects. In one embodiment of the present invention, there is no need to obtain all the above effects. Other effects will be apparent from and can be derived from the description of the specification, the drawings, the claims, and the like.

BRIEF DESCRIPTION OF THE DRAWINGS

FIGS. 11A to 11 C illustrate a rectangular secondary battery of one embodiment of the present invention.

FIGS. 13A-1, 13A-2, 13B-1, and 13B-2 illustrate power storage devices of one embodiment of the present invention.

DETAILED DESCRIPTION OF THE INVENTION

Figure 1:
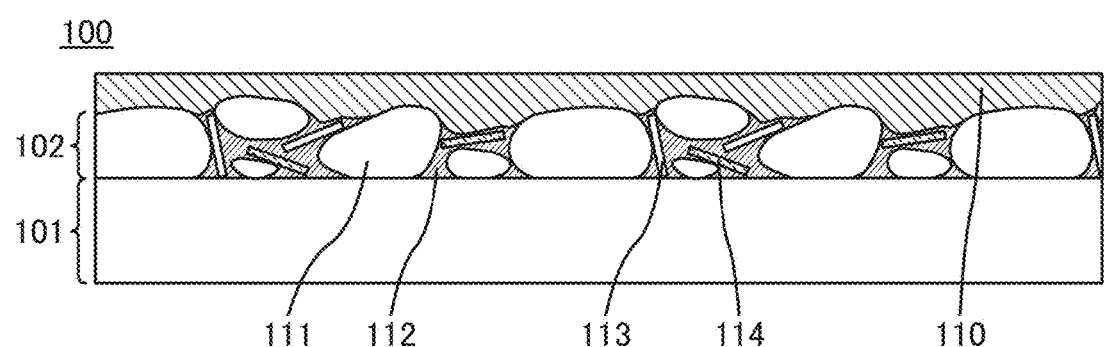
FIG. 1 is a cross-sectional view illustrating a structural example of a negative electrode of one embodiment of the present invention.

Embodiments will be described in detail with reference to drawings. Note that the present invention is not limited to the description below, and it is easily understood by those skilled in the art that modes and details can be modified in various ways without departing from the spirit and scope of the present invention. Accordingly, the present invention should not be construed as being limited to the description of the embodiments.

Note that in the structures of the invention described below, the same portions or portions having similar functions are denoted by the same reference numerals in different drawings, and description of such portions is not repeated. The same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

(Embodiment 1)

In this embodiment, a negative electrode of one embodiment of the present invention will be described with reference to drawings.

[Structural Example]

FIG. 1 illustrates a cross section of a structural example of a negative electrode 100 described below. The negative electrode 100 includes, over a surface of a current collector 101, a negative electrode active material layer 102 and a covering layer 110 that covers the negative electrode active material layer 102. The negative electrode active material layer 102 includes a negative electrode active material 111 and a binder 112. As illustrated in FIG. 1, the negative electrode active material layer 102 may include a conductive additive 113 and a metal flake 114.

A material containing a metal or alloy having a low melting point (e.g., 250° C. or lower) is preferably used for the negative electrode active material 111. For example, a low melting point metal such as gallium (Ga), mercury (Hg), indium (In), or tin (Sn), or an alloy or compound containing any of these low melting point metals can be used. For example, an In—Ga alloy, an In—Sn alloy, a Ga—Sn alloy, or an In—Ga—Sn alloy (also referred to as galinstan) can be used. In particular, a material containing gallium is preferably used.

The binder 112 has a function of binding the negative electrode active materials 111 or binding the negative electrode active material 111 with the current collector 101. A material containing a resin is preferably used for the binder 112. For example, polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, or nitrocellulose can be used in addition to polyvinylidene fluoride (PVDF).

The conductive additives 113 are preferably dispersed in the binder 112. Alternatively, the amount of binder 112 may be small as long as the binder 112 can bind the conductive additives 113. For example, depending on the volume ratio of the binder 112 to the conductive additive 113, the binder 112 mainly exists between two conductive additives 113, and the plural conductive additives 113 bound by the binder 112 form a skeleton of the negative electrode active material layer 102 in some cases. With the conductive additive 113, electrical connection between the negative electrode active materials 111 or between the negative electrode active material 111 and the current collector 101 can be established easily, so that the negative electrode can easily occlude lithium ions. A fiber conductive material such as a vapor-grown carbon fiber (VGCF) is preferably used for the conductive additive 113. The representative values of VGCF are as follows: the fiber diameter is 150 nm; the fiber length is 10 µm or more and 20 µm or less; the real density is 2 g/cm$^3$; and the specific surface area is 13 m$^2$/g. Note that when a cross section perpendicular to a fiber axis is regarded as a cutting plane in a two-dimensional SEM image, the fiber diameter is a diameter of a perfect circle that circumscribes the cutting plane. The real density is a density calculated using a volume occupied by a substance itself. The specific surface area is a surface area of an object per unit mass or per unit volume. Alternatively, a particle-like material can be used for the conductive additive 113. A typical example of the particle-like material is carbon black, such as acetylene black or ketjen black, whose diameter is 3 nm or more and 500 nm or less.

The fiber-like material that can be used for the conductive additive 113 has a function of binding the negative electrode active materials 111, which suppresses deterioration of a battery. The fiber-like material also functions as a structure body or cushioning for keeping the shape of the negative electrode active material layer 102. With the negative electrode active material layer 102 functioning as a structural body or cushioning, separation between the current collector and the active material is less likely to occur when expansion and contraction of the negative electrode active material 111 are repeated or the secondary battery is bent. Although carbon black such as acetylene black or ketjen black may be used instead of the fiber-like material, it is preferable to use VGCF because the strength for keeping the shape of the negative electrode active material layer 102 can be increased. When the strength for keeping the shape of the negative electrode active material layer 102 is high, deterioration of the secondary battery caused by deformation (e.g., bending) can be prevented.

The metal flake 114 is preferably dispersed in the binder 112. With the metal flake 114, electrical connection between the negative electrode active materials 111 or between the negative electrode active material 111 and the current collector 101 can be established more easily, so that the negative electrode can easily occlude lithium ions.

As illustrated in FIG. 1, some of the negative electrode active materials 111 project upward from a surface of the binder 112 (in the direction opposite to the current collector 101) and is not covered with the binder 112 in some cases. The covering layer 110 is provided to surely cover a surface of the negative electrode active material 111 exposed from the surface of the binder 112.

A material through which carrier ions easily pass can be used for the covering layer 110. For example, a resin, a porous material, or a fiber-like material can be used. For the covering layer 110, a porous solid electrolyte can be used in addition to the material that can be used for the binder 112.

In the covering layer 110, conductive materials, in particular, conductive fiber-like materials are preferably diffused. For example, a material that can be used for the conductive additive 113 can be used.

The covering layer 110 preferably has a thickness large enough to surely cover a surface of the negative electrode active material 111 which is not covered with the binder 112. As the thickness of the covering layer 110 is larger, the covering layer 110 can cover the surface of the negative electrode active material 111 more surely. For example, the covering layer 110 includes a region (part) whose thickness from a surface of the binder 112 is 1 µm or more, preferably 3 µm or more, more preferably 50 µm or more. On the other hand, when the covering layer 110 is too thick, the capacitance per weight or per volume of the negative electrode is decreased. Thus, the covering layer 110 may include a region (part) whose thickness is, for example, 200 µm or less, preferably 100 µm or less. When the binder 112 includes a region (part) with a first thickness and the covering layer 110 includes a region (part) with a second thickness, the first thickness is preferably larger than the second thickness, for example. Note that one embodiment of the present invention is not limited thereto.

Here, an alloy in contact with both the negative electrode active material 111 and the current collector 101 preferably exists between the negative electrode active material 111 and the current collector 101. At this time, the alloy preferably contains both a metal contained in the current collector 101 and a metal contained in the negative electrode active material 111.

A material that is alloyed with the current collector 101 is preferably used for the negative electrode active material 111. With such a material, an alloy that contains both the metal contained in the current collector 101 and the metal contained in the negative electrode active material 111 can be formed easily between the current collector 101 and the negative electrode active material 111. For example, it is preferable to make the current collector 101 and the negative electrode active material 111 be in contact with each other so that alloying is caused near the contact interface.

The alloy between the negative electrode active material 111 and the current collector 101 improves the adhesion between the current collector 101 and the negative electrode active material 111, and separation can be suppressed even when the negative electrode active material 111 expands or contracts or the negative electrode 100 is deformed.

Figure 2A:
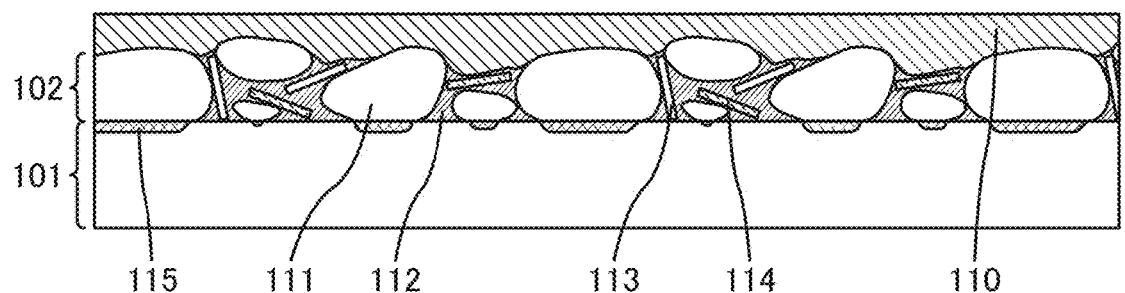
FIGS. 2A to 2D are cross-sectional views each illustrating a structural example of a negative electrode of one embodiment of the present invention.
Figure 2B:
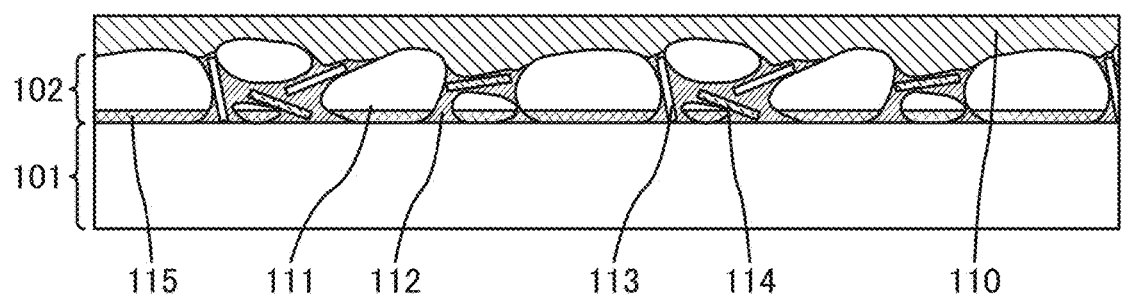
Figure 2C:
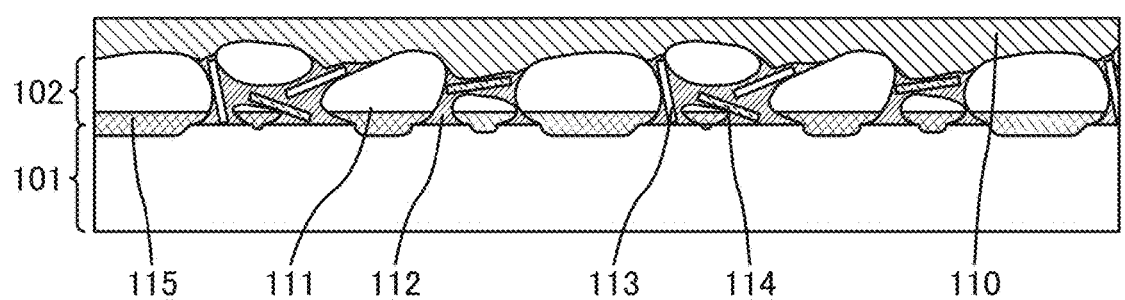
Figure 2D:
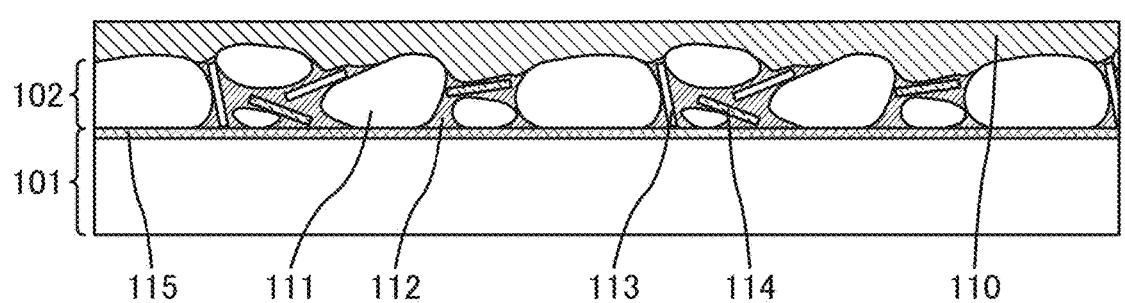

FIG. 2A illustrates the case where part of the current collector 101 is alloyed to form an alloy 115. FIG. 2B illustrates the case where part of the negative electrode active material 111 is alloyed to form the alloy 115. FIG. 2C illustrates the case where part of the current collector 101 and part of the negative electrode active material 111 are alloyed to form the alloy 115. In the case where the negative electrode active material 111 is alloyed, depending on the size of the negative electrode active material 111, the whole of the negative electrode active material 111 may be alloyed to form the alloy 115 which projects from the surface of the current collector 101. A structure illustrated in FIG. 2D may be employed in which the surface of the current collector 101 is alloyed to form the alloy 115 which covers the surface of the current collector 101.

The alloying described above can be observed as differences in contrast by cross-section observation using, for example, a scanning electron microscope (SEM) or a scanning transmission electron microscope (STEM). Furthermore, the existence of the alloy can be confirmed by X-ray diffraction (XRD), energy dispersive X-ray spectroscopy (EDX), or the like. For example, when gallium is used for the negative electrode active material 111 and copper is used for the current collector 101, $CuGa_2$ can be confirmed.

Figure 3:
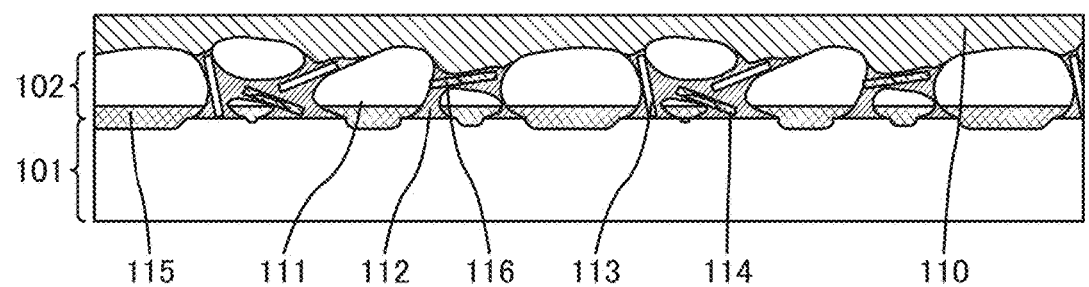
FIG. 3 is a cross-sectional view illustrating a structural example of a negative electrode of one embodiment of the present invention.

A material that is alloyed with the negative electrode active material 111 is preferably used for the metal flake 114. In particular, a material containing a metal element the same as that contained in the current collector 101 is preferably used for the metal flake 114. With the use of such a material, part or the whole of the metal flake 114 is alloyed to form an alloy 116 between the metal flake 114 and the negative electrode active material 111, as illustrated in FIG. 3. The alloy 116 is in contact with both the metal flake 114 and the negative electrode active material 111, so that the adhesion therebetween can be improved.

[Deterioration of Negative Electrode]

Next, a reason why deterioration of the negative electrode is suppressed by providing the covering layer 110 will be described.

Figure 4:
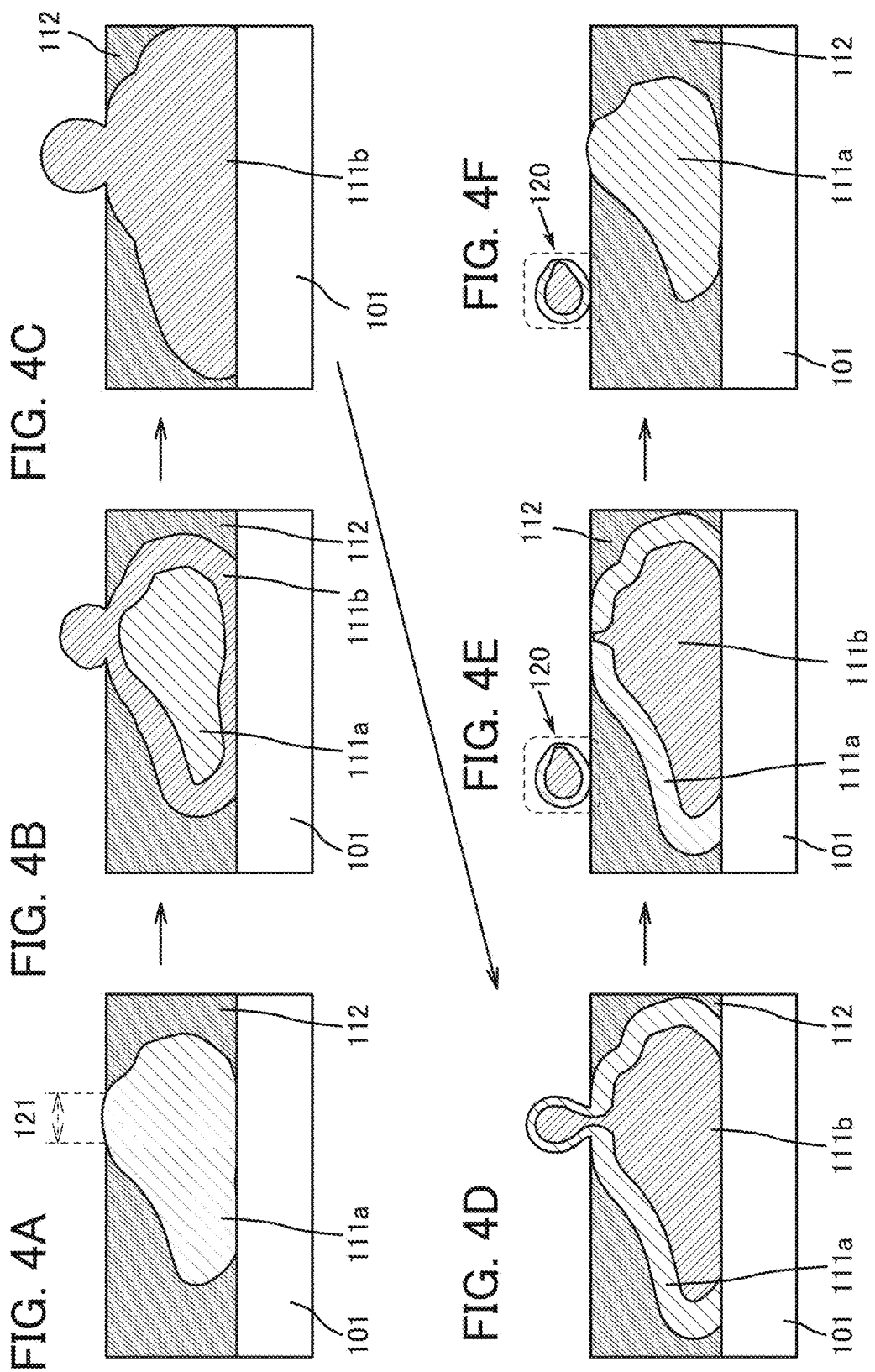
FIGS. 4A to 4F are cross-sectional views illustrating a structural example of a negative electrode of one embodiment of the present invention.

FIG. 4A is a schematic view illustrating a cross section of a negative electrode before being charged in the case where the covering layer 110 is not provided in the negative electrode. A negative electrode active material 111a which does not react with carrier ions is in contact with the current collector 101 and has a region 121 that is not covered with the binder 112.

Although the case where the negative electrode active material 111*a* is in contact with the current collector 101 will be described below, the same applies to the case where the negative electrode active material 111*a* is in contact with the conductive additive 113 or the metal flake 114, instead of the current collector 101.

FIG. 4B is a schematic view illustrating a cross section in the state where a charge reaction proceeds. Charging makes the unreacted negative electrode active material 111*a* react a carrier ion. The reaction starts from a portion near a surface of the negative electrode active material 111*a*. Accordingly, a negative electrode active material 111*b*, which contains an alloy of a carrier ion and a metal contained in the negative electrode active material 111*a*, is formed to surround the unreacted negative electrode active material 111*a*. By alloying with a carrier ion, the volume of the negative electrode active material 111*b* is increased as compared with the unreacted negative electrode active material 111*a* because the negative electrode active material 111*b* contains the carrier ion.

In the case where gallium is used for the negative electrode active material and lithium is used for a carrier ion, since an alloy of lithium and gallium has a higher melting point than gallium, when charging is performed at a temperature (e.g., 35° C.) a little higher than the melting point of gallium, liquid gallium and lithium are alloyed to be a solid alloy. When discharging is performed, lithium is separated from the solid alloy, so that liquid gallium is formed.

At this time, in the region that is not covered with the binder 112, volume expansion is not inhibited and thus occurs more easily than in the other regions. As a result, the negative electrode active material 111*b* containing a carrier ion is likely to project upward as illustrated in FIG. 4B.

FIG. 4C illustrates the state where a charge reaction further proceeds, so that the entire unreacted negative electrode active material 111*a* is reacted to the negative electrode active material 111*b* containing a carrier ion. Since the reaction with a carrier ion is likely to occur near the surface of the negative electrode active material, the projecting region is expanded isotropically. As a result, the diameter of the negative electrode active material 111*b* containing a carrier ion becomes smaller toward a surface of the binder 112 as illustrated in FIG. 4C. In other words, the negative electrode active material 111*b* is likely to have a constricted part.

Next, discharging is performed. By the discharging, a reaction in that a carrier is released from the negative electrode active material 111*b* containing a carrier ion occurs easily near the surface of the negative electrode active material. Thus, as illustrated in FIG. 4D, the negative electrode active material 111*a* from which a carrier ion is released is formed to cover the surface of the negative electrode active material 111*b* containing a carrier ion. Due to the release of carrier ions, the total volume of the negative electrode active material is decreased.

The negative electrode active material 111*b* containing a carrier ion after charging has a constricted part as described above, and the diameter of the constricted part becomes smaller as illustrated in FIG. 4D, as the volume of the negative electrode active material is decreased by discharging. Accordingly, when an external stress or the like is applied, the negative electrode active material is easily broken at the projecting portion, so that an isolated negative electrode active material 120 is formed as illustrated in FIG. 4E. Furthermore, even when an external stress is not applied, if the temperature in discharging is higher than the melting point of the negative electrode active material, the projecting portion is naturally separated by surface tension of the liquid negative electrode active material, so that the isolated negative electrode active material 120 is formed in some cases.

FIG. 4F illustrates the state where discharging further proceeds and all the carrier ions are released from the negative electrode active material 111*b*, so that the negative electrode active material 111*b* is reacted to the negative electrode active material 111*a*. At this time, since the isolated negative electrode active material 120 is separated, the volume in the state of FIG. 4F is smaller than the volume in the state of FIG. 4A by the volume of the isolated negative electrode active material 120. The volume of the negative electrode active material that contributes to charge and discharge is decreased, so that the capacitance of the negative electrode 100 is reduced. In addition, in the case where the isolated negative electrode active material 120 has a region containing a carrier ion as illustrated in FIG. 4F, the amount of carrier ions that contribute to charge and discharge is also reduced, leading to deterioration of a battery.

As illustrated in FIG. 4F, the isolated negative electrode active material 120 remains and is in contact with the surface of the binder 112 in many cases. However, if the isolated negative electrode active material 120 moves to the electrolyte solution side, it might cause clogging of a separator, leading to deterioration of a battery.

When the isolated negative electrode active material 120 remains in the binder 112 and is in contact with the conductive additive or the metal flake dispersed in the binder 112, the negative electrode active material 120 contributes to charge and discharge and is not a factor of reducing the capacitance of the negative electrode 100 in some cases. However, a reduction reaction with an electrolyte solution occurs at a surface of the isolated negative electrode active material 120, and part of the electrolyte solution is decomposed to form an insulating film. After the insulating film is formed, even when the isolated negative electrode active material 120 moves over the surface of the binder 112 and comes into in contact with the conductive additive, the metal flake, or another negative electrode active material, the isolated negative electrode active material 120 is insulated by the insulating film; thus, contribution to charge and discharge by the isolated negative electrode active material 120 is difficult.

Next, the case where the covering layer 110 is provided will be described.

Figure 5:
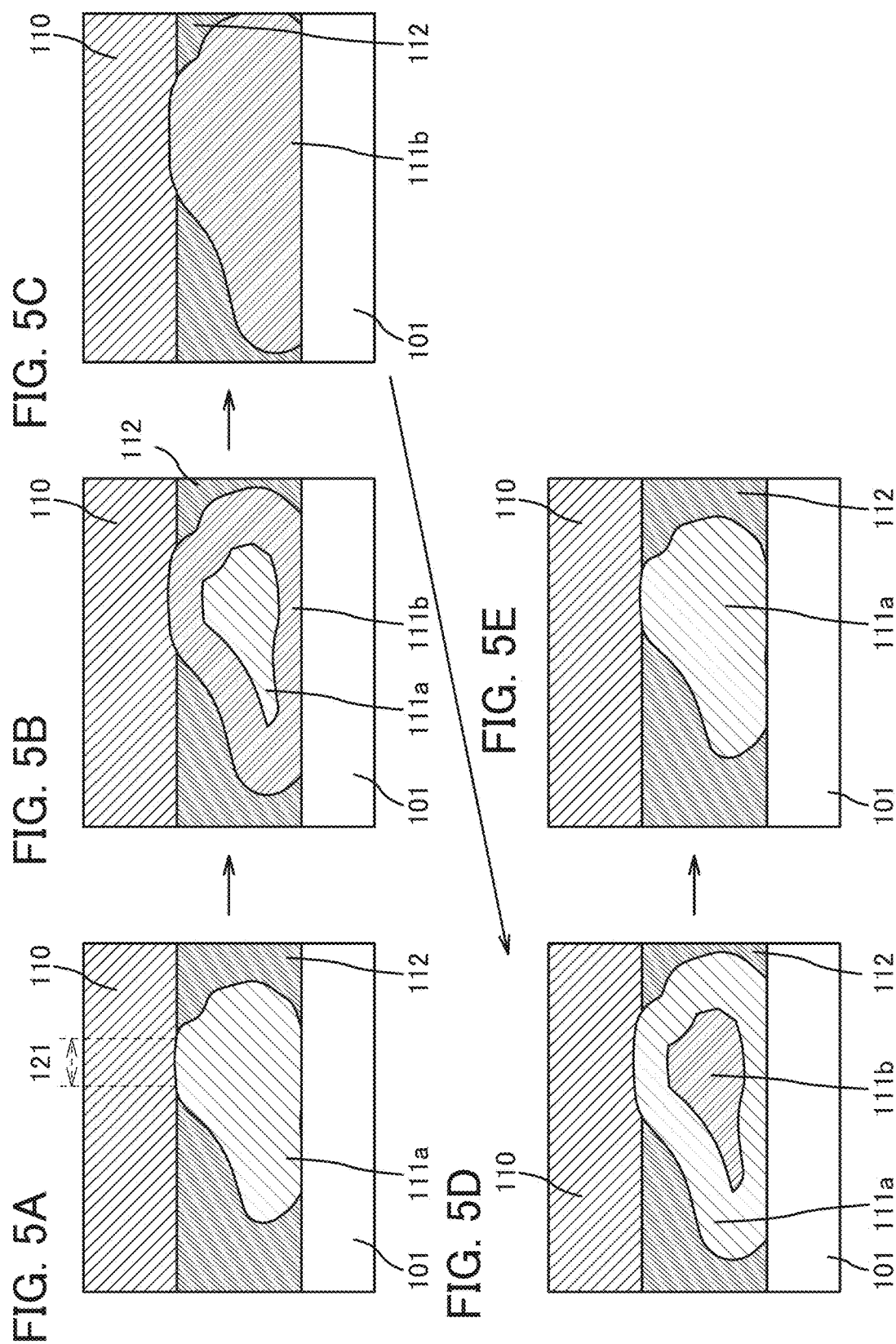
FIGS. 5A to 5E are cross-sectional views illustrating a structural example of a negative electrode of one embodiment of the present invention.

FIG. 5A illustrates a cross section of a structural example of a negative electrode before being charged. The structure illustrated in FIG. 5A is different from the structure illustrated in FIG. 4A in that the covering layer 110 covering a top surface of the unreacted negative electrode active material 111*a* is provided.

Since the surface of the negative electrode active material 111*a* is surely covered with the binder 112 and the covering layer 110, even when the negative electrode active material 111*a* reacts with a carrier ion and increases in its volume owing to charging, a projecting portion that projects upward from a surface of the binder 112 is not formed, and volume expansion occurs substantially isotropically as illustrated in FIG. 5B. Therefore, even in the state where the unreacted negative electrode active material 111*a* entirely reacts and becomes the negative electrode active material 111*b* containing a carrier ion (FIG. 5C), a projecting portion is not formed.

In discharging, since the negative electrode active material 111b does not have a projecting portion, the volume is isotropically decreased (FIG. 5D). As a result, the shape of the negative electrode active material 111a, which is in a state after all carrier ions are released from the negative electrode active material 111b, illustrated in FIG. 5E is substantially the same as the shape illustrated in FIG. 5A before being charged and discharged. Furthermore, part of the negative electrode active materials 111a and 111b is not separated; thus, the volume of the negative electrode active material 111a is hardly changed before and after the charge and discharge.

As described above, a surface of the negative electrode active material 111 which is not covered with the binder 112 is surely covered with the covering layer 110, so that separation of part of the negative electrode active material 111 caused by repeated charge and discharge can be prevented. Consequently, a decrease in capacitance of the negative electrode caused by charge and discharge can be effectively suppressed.

In addition, even in the case where the negative electrode active material 111 is in a liquid state, the negative electrode active material 111 is prevented from leaking from the upper side (side opposite to the current collector 101 side) when external force (e.g., deformation) is applied, because it is covered with the covering layer 110.

The above is the description on the deterioration of the negative electrode.

[Example of Manufacturing Method]

Figure 6:
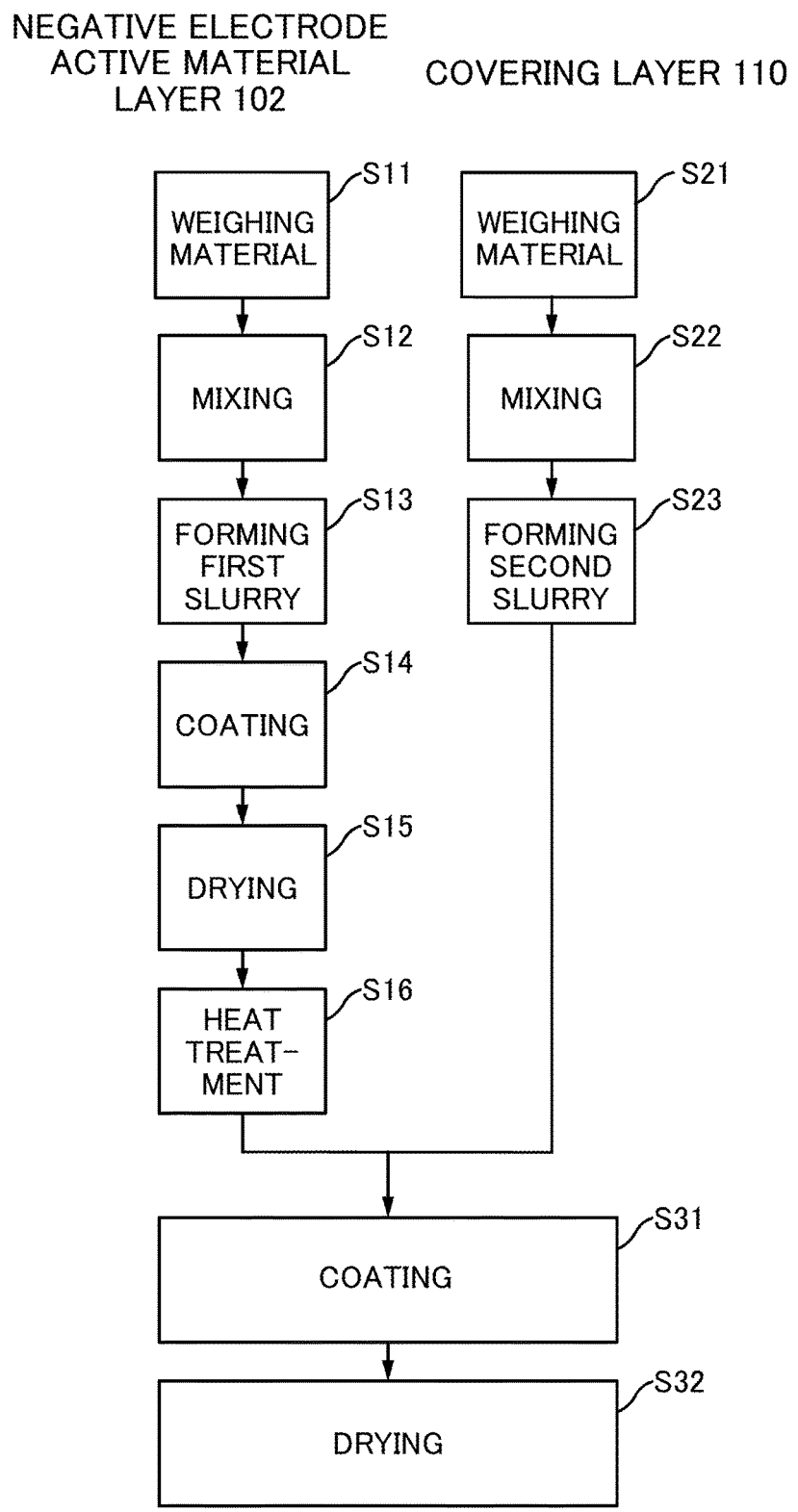
FIG. 6 is a flow diagram illustrating a process of forming a negative electrode of one embodiment of the present invention.

An example of a method of manufacturing a negative electrode of one embodiment of the present invention will be described with reference to FIG. 6. FIG. 6 is a flow diagram of the manufacturing method described below.

First, materials of the negative electrode active material layer 102 are weighted (S11). For example, materials used for the negative electrode active material 111, the binder 112, the conductive additive 113, and the metal flake 114 are each weighted. Next, these materials are mixed (S12) and kneaded with a kneading machine or the like to form first slurry (S13). At the step of forming the first slurry, a solvent is added to adjust viscosity of the first slurry for an application step performed later. Next, the first slurry is applied to the current collector 101 (S14). Then, temporary heat treatment is performed to vaporize the solvent and dry the first slurry (S15), followed by heat treatment at a higher temperature (S16). By the heat treatment, the negative electrode active material 111 comes into contact with the current collector 101 or the metal flake 114 to form an alloy.

Materials to be the covering layer 110 are prepared. First, the materials of the covering layer 110 are weighted (S21). Then, the materials are mixed (S22) and kneaded with a kneading machine or the like to form second slurry including the materials of the covering layer 110 (S23). At the step of forming the second slurry, as described above, a solvent is added to adjust the viscosity of the second slurry for a later application step.

After the heat treatment described in S16, the second slurry including the materials of the covering layer 110 is applied to the current collector (S31). Then, heat treatment is performed to vaporize the solvent and dry the second slurry (S32).

Through the above steps, a negative electrode of one embodiment of the present invention can be manufactured. With the use of the negative electrode of one embodiment of the present invention, various power storage devices can be manufactured. Examples of the power storage devices are a battery, a secondary battery, and a lithium ion secondary battery. In addition, a capacitor is given as another example of the power storage devices. For example, with a combination of the negative electrode of one embodiment of the present invention and an electric double layer positive electrode, a capacitor such as a lithium ion capacitor can be manufactured.

At least part of this embodiment can be implemented in combination with any of the embodiments described in this specification as appropriate.

(Embodiment 2)

[Coin-Type Storage Battery]

Figure 7A:
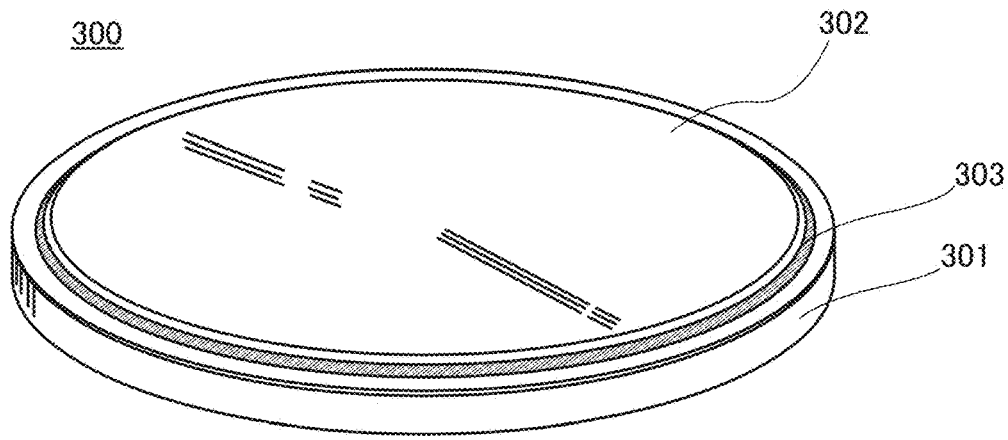
FIGS. 7A to 7C illustrate a coin-type secondary battery of one embodiment of the present invention.
Figure 7B:
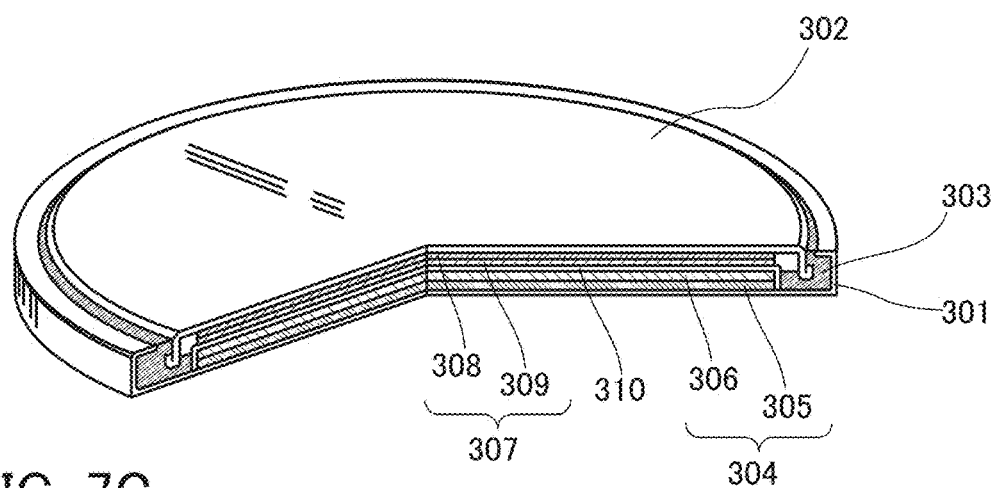

FIG. 7A is an external view of a coin-type (single-layer flat type) storage battery, and FIG. 7B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used. Graphene is flaky and has an excellent electric characteristic of high conductivity and excellent physical properties of high flexibility and high mechanical strength. Thus, the use of graphene as the conductive additive can increase contact points and the contact area of active materials. Note that graphene in this specification includes single-layer graphene and multilayer graphene including two or more and a hundred or less layers. Single-layer graphene refers to a one-atom-thick sheet of carbon molecules having $\pi$ bonds.

A negative electrode 307 includes a negative electrode current collector 308 and a negative electrode active material layer 309 provided in contact with the negative electrode current collector 308. The negative electrode active material layer 309 includes the negative electrode active material layer 102 and the covering layer 110 which are described in Embodiment 1. The negative electrode active material layer 309 may further include a binder for increasing adhesion of negative electrode active materials, a conductive additive for increasing the conductivity of the negative electrode active material layer, and the like. A separator 310 and an electrolyte (not illustrated) are provided between the positive electrode active material layer 306 and the negative electrode active material layer 309.

The material described in Embodiment 1 (e.g., gallium) is used as a negative electrode active material in the negative electrode active material layer 309. For example, copper is used as the negative electrode current collector 308, and copper and gallium are alloyed. The adhesion between the current collector and the active material (gallium) is improved by the alloying, and thus deterioration due to expansion and contraction or deterioration of a secondary battery due to deformation (e.g., bending) can be prevented. Furthermore, by the covering layer included in the negative electrode active material layer 309, the negative electrode active material can be surely held over a surface of the current collector; thus, deterioration in characteristics of the secondary battery can be suppressed.

The current collectors 305 and 308 can each be formed with a highly conductive material which is not alloyed with a carrier ion of lithium among other elements, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 10 μm to 30 μm inclusive.

Examples of a positive electrode active material used for the positive electrode active material layer 306 include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

Alternatively, a complex material ($LiMPO_4$ (general formula) (M is one or more of Fe(II), Mn(II), Co(II), and Ni(II))) can be used. Typical examples of $LiMPO_4$ (general formula) which can be used as a material are lithium compounds such $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq1$, $0<c<1$, $0<d<1$, and $0<e<1$), and $LiFe_fNi_gCo_hMn_iPO_4$ ($f+g+h+i\leq1$, $0<f<1$, $0<g<1$, $0<h<1$, and $0<i<1$).

Alternatively, a complex material such as $Li_{(2-j)}MSiO_4$ (general formula) (M is one or more of Fe(II), Mn(II), Co(II), and Ni(II); $0\leq j\leq2$) can be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\leq1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\leq1$, $0<m<1$, $0<n<1$, and $0<q<1$), and $Li_{(2-j)}Fe_rNi_sCo_tMn_uSiO_4$ ($r+s+t+u\leq1$, $0<r<1$, $0<s<1$, $0<t<1$, and $0<u<1$).

Alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Still alternatively, a compound expressed by the general formula $Li_2MPO_4F$, $Li_2MP_2O_7$, or $Li_5MO_4$ (M=Fe or Mn), a perovskite fluoride such as $NaFeF_3$ or $FeF_3$, a metal chalcogenide (a sulfide, a selenide, or a telluride) such as $TiS_2$ or $MoS_2$, an oxide with an inverse spinel crystal structure such as $LiMVO_4$, a vanadium oxide (e.g., $V_2O_5$, $V_6O_{13}$, or $LiV_3O_8$), a manganese oxide, an organic sulfur compound, or the like can be used as the positive electrode active material.

In the case where carrier ions are alkali metal ions other than lithium ions, alkaline-earth metal ions, beryllium ions, aluminum ions, or magnesium ions, the following may be used as the positive electrode active material: an alkali metal (e.g., sodium or potassium), or an alkaline-earth metal (e.g., calcium, strontium, or barium, beryllium, or magnesium).

As the separator 310, an insulator such as cellulose (paper), polyethylene with pores, and polypropylene with pores can be used.

As an electrolyte of an electrolyte solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

Note that when carrier ions are alkali metal ions other than lithium ions, alkaline-earth metal ions, beryllium ions, or magnesium ions, instead of lithium in the above lithium salts, an alkali metal (e.g., sodium and potassium), an alkaline-earth metal (e.g., calcium, strontium, barium, beryllium, and magnesium) may be used for the electrolyte.

As a solvent of the electrolytic solution, a material in which carrier ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid is a salt in the liquid state and has high ion mobility (conductivity). The ionic liquid includes a cation and an anion. Examples of the ionic liquid are an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having corrosion resistance to an electrolytic solution, such as nickel, aluminum, or titanium, an alloy of such metals, or an alloy of such a metal and another metal (stainless steel or the like) can be used. Alternatively, it is preferable to cover the positive electrode can 301 and the negative electrode can 302 with nickel, aluminum, or the like in order to prevent corrosion due to the electrolytic solution. The positive electrode can 301 and the negative electrode can 302 are electrically connected to the positive electrode 304 and the negative electrode 307, respectively. When an exterior body containing a resin material is used instead of the positive electrode can 301 formed with metal or the negative electrode can 302 formed with metal, the coin-type storage battery 300 can have flexibility. Note that in the case where the exterior body containing a resin material is used, a conductive material is used for a portion connected to the outside.

The negative electrode 307, the positive electrode 304, and the separator 310 are immersed in the electrolytic solution. Then, as illustrated in FIG. 7B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery will be described with reference to FIG. 7C. When a battery using lithium is regarded as a closed circuit, lithium ions transfer and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 7C:
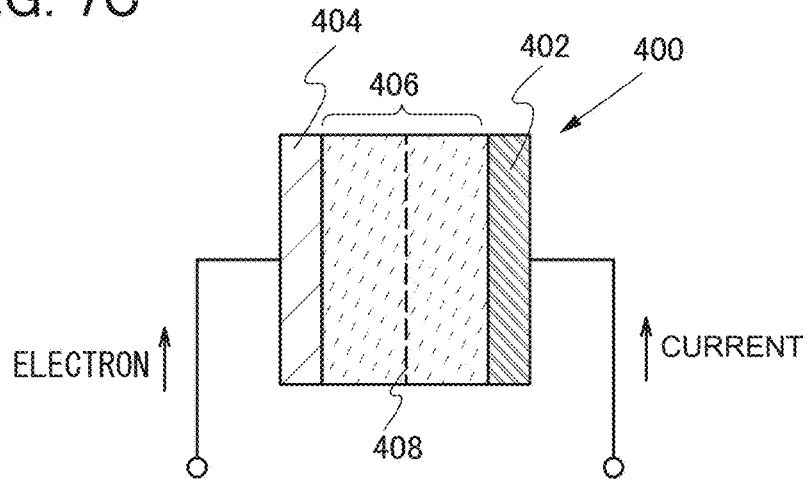

Two terminals in FIG. 7C are connected to a charger, and a storage battery 400 is charged. As the charge of the storage battery 400 proceeds, a potential difference between electrodes increases. The positive direction in FIG. 7C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current. Moreover, a separator 408 and an electrolyte 406 are provided between the positive electrode 402 and the negative electrode 404.

[Cylindrical Storage Battery]

Figure 8A:
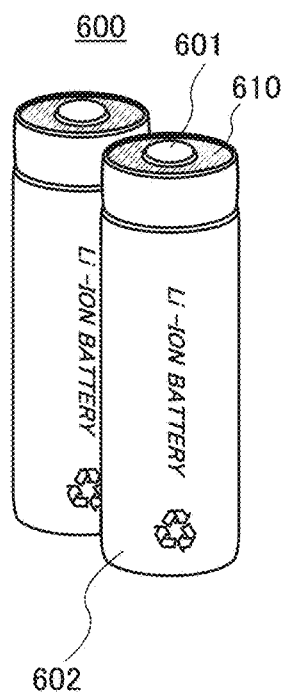
FIGS. 8A and 8B illustrate a cylindrical secondary battery of one embodiment of the present invention.

Next, an example of a cylindrical storage battery will be described with reference to FIGS. 8A and 8B. As illustrated in FIG. 8A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 8B:
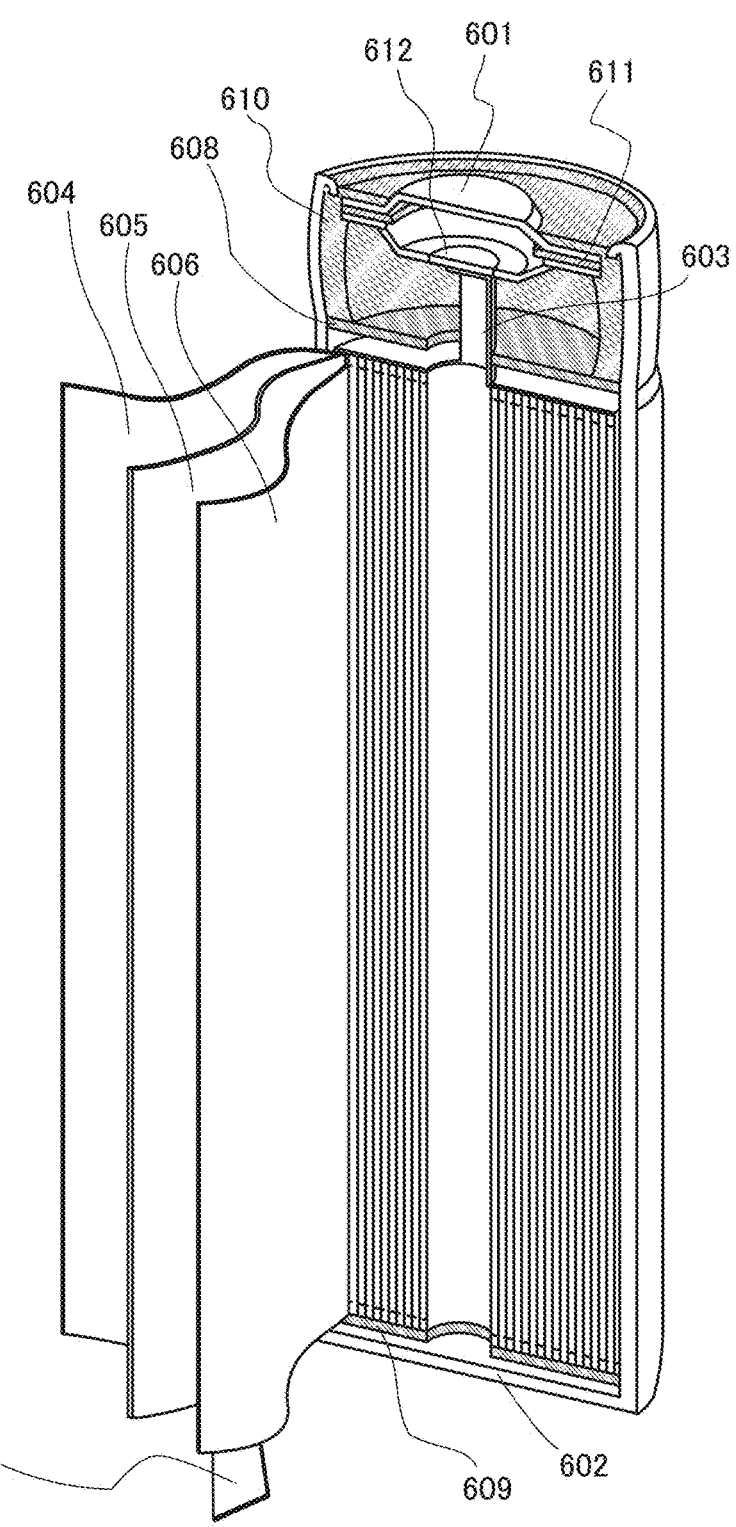

FIG. 8B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having corrosion resistance to an electrolytic solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion caused by an electrolytic solution. Inside the battery can 602, the battery element in which the positive electrode, the negative electrode, and the separator are wound is provided between a pair of insulating plates 608 and 609 which face each other. Inside the battery can 602, the battery element in which the positive electrode, the negative electrode, and the separator are wound is interposed between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution which is similar to that of the above coin-type storage battery can be used. Note that when an exterior body including a resin material is used instead of the battery can 602 formed with metal, a flexible cylindrical storage battery can be manufactured. Note that in the case where an exterior body including a resin material is used, a conductive material is used for a portion connected to the outside.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed with a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

[Laminated Storage Battery]

Next, an example of a laminated storage battery will be described with reference to FIG. 9A. When a flexible laminated storage battery is used in an electronic device at least part of which is flexible, the storage battery can be bent as the electronic device is bent.

Figure 9A:
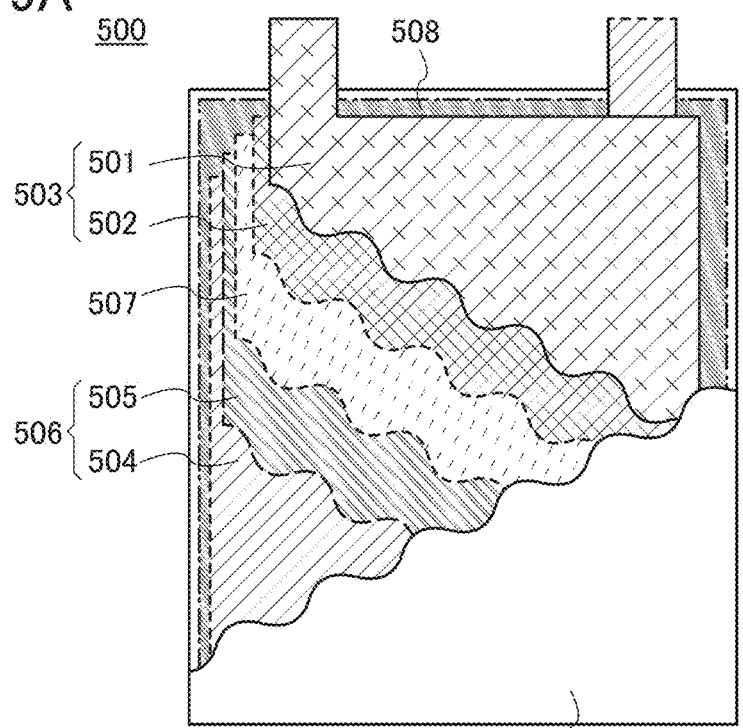
FIGS. 9A and 9B illustrate a laminated secondary battery of one embodiment of the present invention.

A laminated storage battery 500 illustrated in FIG. 9A includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and a exterior body 509. The separator 507 is provided between the positive electrode 503 and the negative electrode 506 in the exterior body 509. The exterior body 509 is filled with the electrolytic solution 508.

In the laminated storage battery 500 illustrated in FIG. 9A, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed to the outside the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, part of the lead electrode may be exposed to the outside the exterior body 509.

As the exterior body 509 in the laminated storage battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. In this specification, the laminate film refers to a stacked film including at least a resin film and a metal film. The laminate film including at least a resin film and a metal thin film is lightweight and has a high barrier property against moisture and a heat dissipation property; thus, the laminate film is suitably used for a storage battery in a portable electronic device.

Figure 9B:
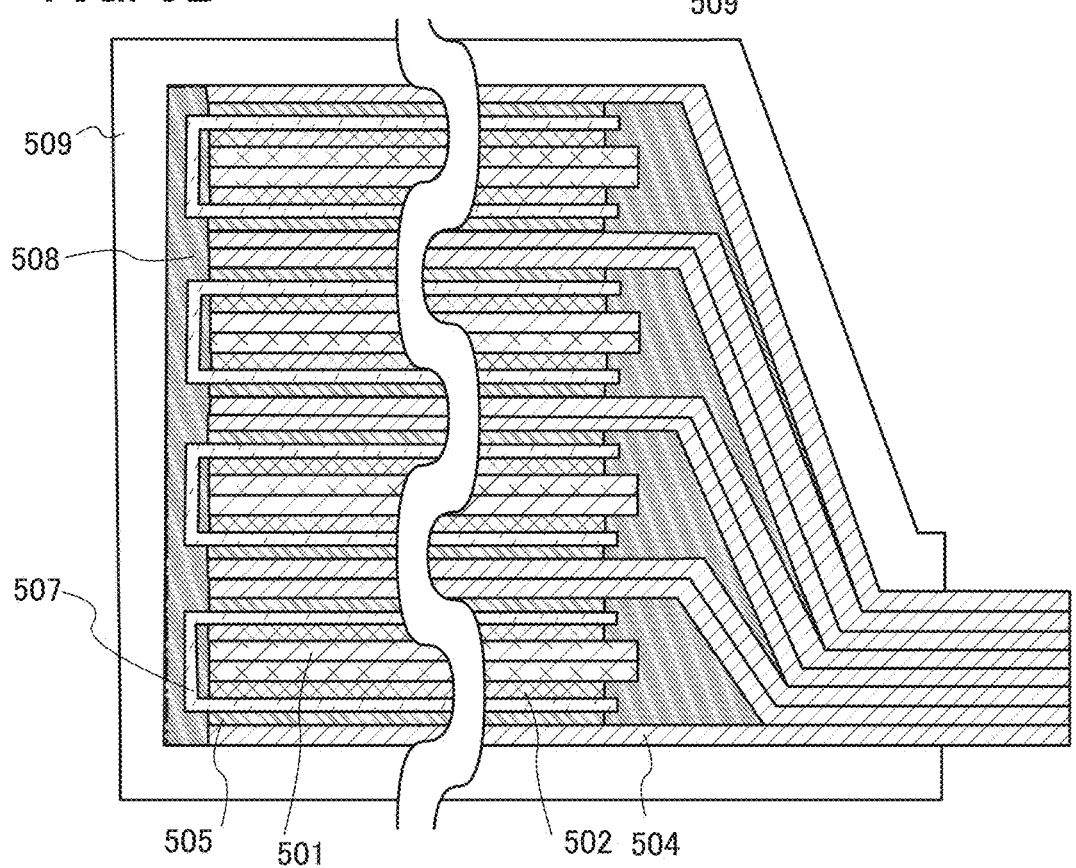

FIG. 9B illustrates an example of the cross-sectional structure of the laminated storage battery 500. Although FIG. 9A illustrates an example of including two current collectors (i.e., a pair of current collectors) for simplicity, the actual battery includes three or more electrode layers.

The example in FIG. 9B includes 16 electrode layers. The laminated storage battery 500 has flexibility even though including 16 electrode layers. In FIG. 9B, 8 negative electrode current collectors 504 and 8 positive electrode current collectors 501 are included. Note that FIG. 9B illustrates a cross section of the lead portion of the negative electrode, and 8 negative electrode current collectors 504 are bonded to each other by ultrasonic welding. For example, with an ultrasonic welder, a plurality of electrode layers are subjected to ultrasonic welding so as to be electrically connected to one another. The method of electrically connecting the current collectors is not limited to ultrasonic welding, and bolting may be employed. It is needless to say that the number of electrode layers is not limited to 16, and may be more than 16 or less than 16. In the case of a large number of electrode layers, the storage battery can have high capacity. In contrast, in the case of a small number of electrode layers, the storage battery can have small thickness and high flexibility.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

For each of the negative electrodes of the storage batteries 300, 500, and 600, which are described in this embodiment, the negative electrode active layer of one embodiment of the present invention is used. Thus, the discharge capacity of the storage batteries 300, 500, and 600 can be increased.

Figure 10A:
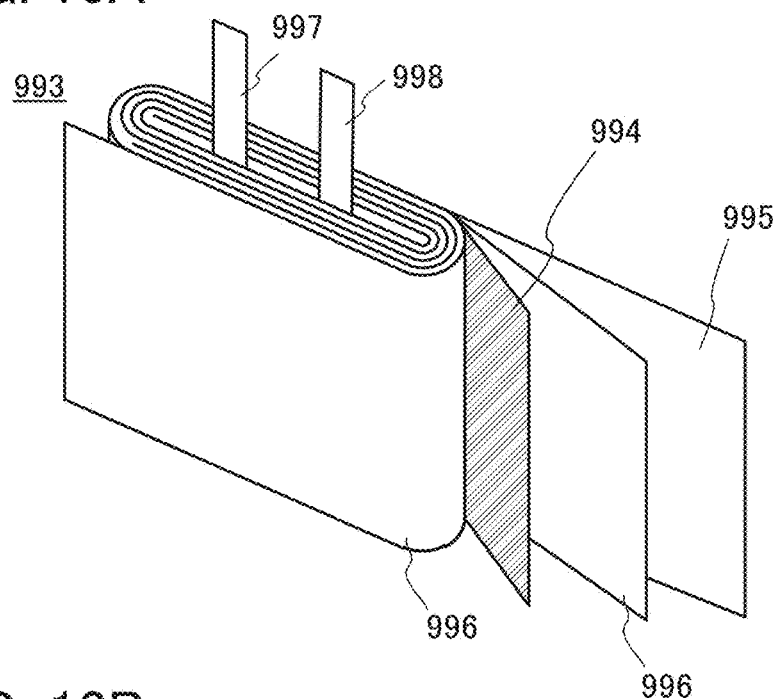
FIGS. 10A to 10C illustrate a laminated secondary battery of one embodiment of the present invention.
Figure 10B:
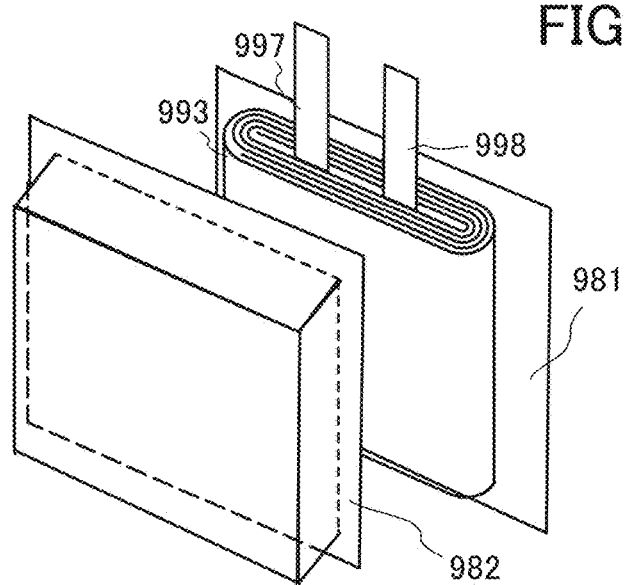
Figure 10C:
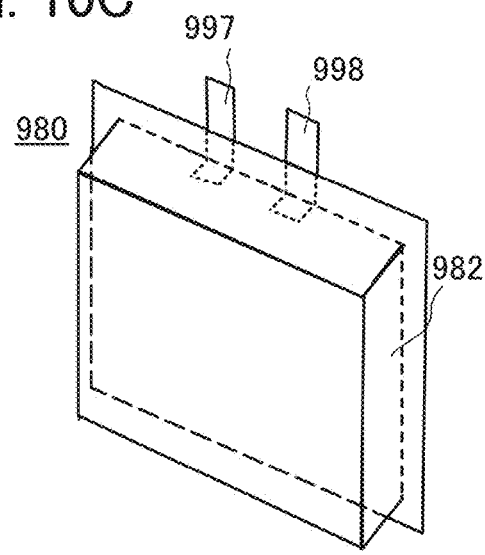

The laminated storage battery is not limited to that illustrated in FIGS. 9A and 9B, and other examples of laminated storage batteries are illustrated in FIGS. 10A to 10C. A wound body 993 illustrated in FIG. 10A includes a negative electrode 994, a positive electrode 995, and a separator 996.

The wound body 993 is obtained by winding a sheet of a stack in which the negative electrode 994 overlaps with the positive electrode 995 with the separator 996 provided therebetween. The wound body 993 is covered with a rectangular sealed container or the like; thus, a rectangular secondary battery is fabricated.

Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

In a power storage device 980 illustrated in FIG. 10C, the wound body 993 is housed in a space formed by bonding a film 981 and a film 982 having a depressed portion (as illustrated in FIG. 10B) by thermocompression bonding or the like. The wound body 993 includes the lead electrode 997 and the lead electrode 998, and is soaked in an electrolyte solution inside the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be deformed when external force is applied; thus, a flexible storage battery can be manufactured. In the case where the film 981 and the film 982 having a depressed portion are deformed when external force is applied, adhesion between the current collector and the active material layer in contact with the current collector can be high by alloying part of the current collector.

Although FIGS. 10B and 10C illustrate an example where a space is formed by two films, the wound body 993 may be housed in a space formed by bending one film.

Furthermore, a flexible power storage device in which not only a laminated storage battery has flexibility but also an exterior body and a sealed container have flexibility can be manufactured when a resin material or the like is used for the exterior body and the sealed container. Note that in the case where a resin material is used for the exterior body and the sealed container, a conductive material is used for a portion connected to the outside.

For example, FIGS. 11A to 11C illustrate an example of a flexible rectangular storage battery. The wound body 993 illustrated in FIG. 11A is the same as that illustrated in FIG. 10A, and a detailed description thereof is omitted.

In the power storage device 990 illustrated in FIG. 11C, the wound body 993 is housed in an exterior body 991. The wound body 993 includes the lead electrode 997 and the lead electrode 998, and is soaked in an electrolyte solution inside the exterior body 991 and an exterior body 992 as illustrated in FIG. 11B. For example, a metal material such as aluminum or a resin material can be used for the exterior bodies 991 and 992. With the use of a resin material for the exterior bodies 991 and 992, the exterior bodies 991 and 992 can be deformed when external force is applied; thus, a flexible rectangular storage battery can be manufactured. In the case where the exterior bodies 991 and 992 are deformed when external force is applied, adhesion between the current collector and the active material layer in contact with the current collector can be high by alloying part of the current collector.

A structural example of a power storage device (power storage unit) is described with reference to FIGS. 12A and 12B, FIGS. 13A-1, 13A-2, 13B-1, and 13B-2, and FIGS. 14A and 14B.

Figure 12A:
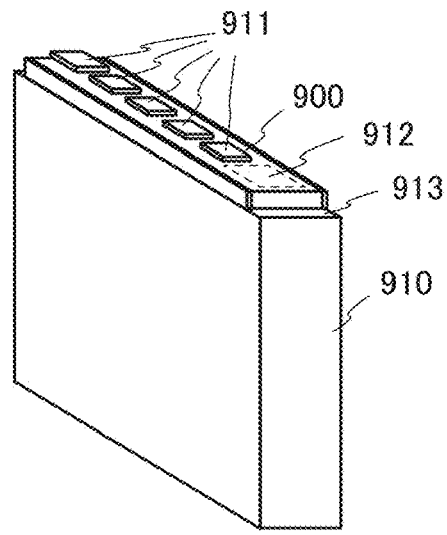
FIGS. 12A and 12B illustrate a power storage device of one embodiment of the present invention.
Figure 12B:
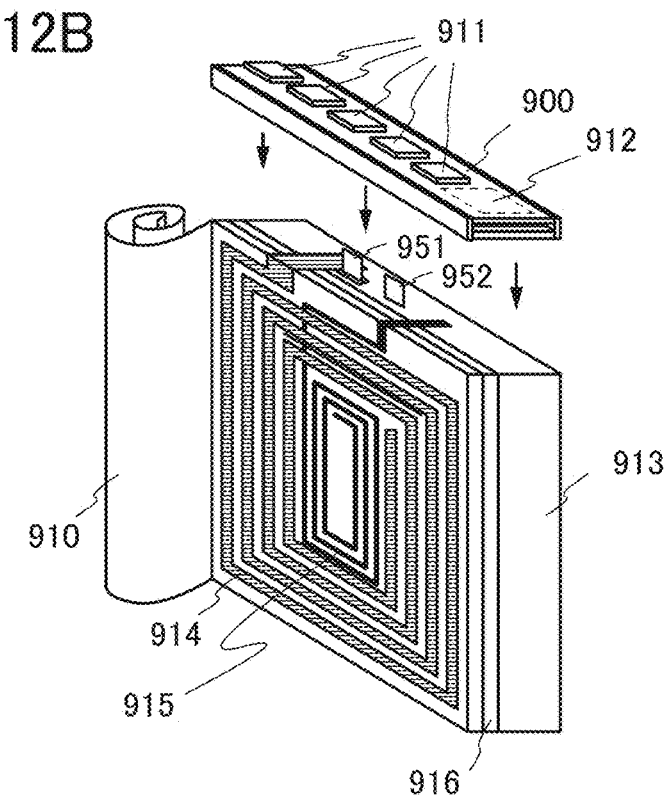

FIGS. 12A and 12B are external views of a power storage device. The power storage device includes a circuit board 900 and a power storage unit 913. A label 910 is attached to the power storage unit 913. As shown in FIG. 12B, the power storage device further includes a terminal 951 and a terminal 952, and includes an antenna 914 and an antenna 915 between the power storage unit 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the power storage unit 913 and the antennas 914 and 915. The layer 916 has a function of blocking an electromagnetic field from the power storage device 913, for example. As the layer 916, for example, a magnetic body can be used. The layer 916 may serve as a shielding layer.

Note that the structure of the power storage device is not limited to that illustrated in FIGS. 12A and 12B.

For example, as illustrated in FIGS. 13A-1 and 13A-2, two opposite surfaces of the power storage unit 913 in FIGS. 12A and 12B may be provided with respective antennas. FIG. 13A-1 is an external view illustrating one side of the opposing surfaces, and FIG. 13A-2 is an external view illustrating the other side of the opposing surfaces. Note that description on the power storage device shown in FIGS. 12A and 12B can be referred to for portions similar to those in FIGS. 12A and 12B, as appropriate.

As illustrated in FIG. 13A-1, the antenna 914 is provided on one of the opposing surfaces of the power storage unit 913 with the layer 916 provided therebetween, and as illustrated in FIG. 13A-2, an antenna 915 is provided on the other of the opposing surfaces of the power storage unit 913 with the layer 917 provided therebetween. The layer 917 has a function of blocking an electromagnetic field from the power storage unit 913. As the layer 917, for example, a magnetic body can be used. The layer 917 may serve as a shielding layer.

With the above structure, both the antenna 914 and the antenna 915 can be increased in size.

Alternatively, as illustrated in FIGS. 13B-1 and 13B-2, two opposite surfaces of the power storage unit 913 in FIGS. 12A and 12B may be provided with different types of antennas. FIG. 13B-1 is an external view illustrating one of the opposite surfaces, and FIG. 13B-2 is an external view illustrating the other of the opposite surfaces. Note that description on the power storage device shown in FIGS. 12A and 12B can be referred to for portions similar to those in FIGS. 12A and 12B, as appropriate.

As illustrated in FIG. 13B-1, the antennas 914 and 915 are provided on one of the opposite surfaces of the power storage unit 913 with the layer 916 provided therebetween, and as illustrated in FIG. 13A-2, an antenna 918 is provided on the other of the opposite surfaces of the power storage unit 913 with the layer 917 provided therebetween. The antenna 918 has a function of performing data communication with an external device, for example. An antenna with a shape that can be applied to the antennas 914 and 915, for example, can be used as the antenna 918. As a system for communication using the antenna 918 between the power storage device and an external device, a response method that can be used between the power storage device and the external device, such as NFC, can be employed.

Figure 14A:
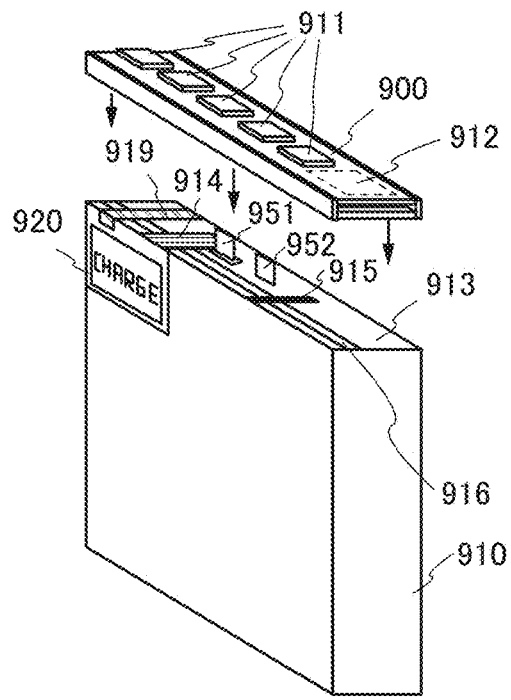
FIGS. 14A and 14B illustrate a power storage device of one embodiment of the present invention.

Alternatively, as illustrated in FIG. 14A, the power storage unit 913 in FIGS. 12A and 12B may be provided with a display device 920. The display device 920 is electrically connected to the terminal 911 via a terminal 919. It is possible that the label 910 is not provided in a portion where the display device 920 is provided. Note that description on the power storage device shown in FIGS. 12A and 12B can be referred to for portions similar to those in FIGS. 12A and 12B, as appropriate.

The display device 920 can display, for example, an image showing whether or not charging is being carried out or an image showing the amount of stored power. As the display device 920, electronic paper, a liquid crystal display device, an electroluminescent (EL) display device, or the like can be used. For example, power consumption of the display device 920 can be reduced when electronic paper is used.

Figure 14B:
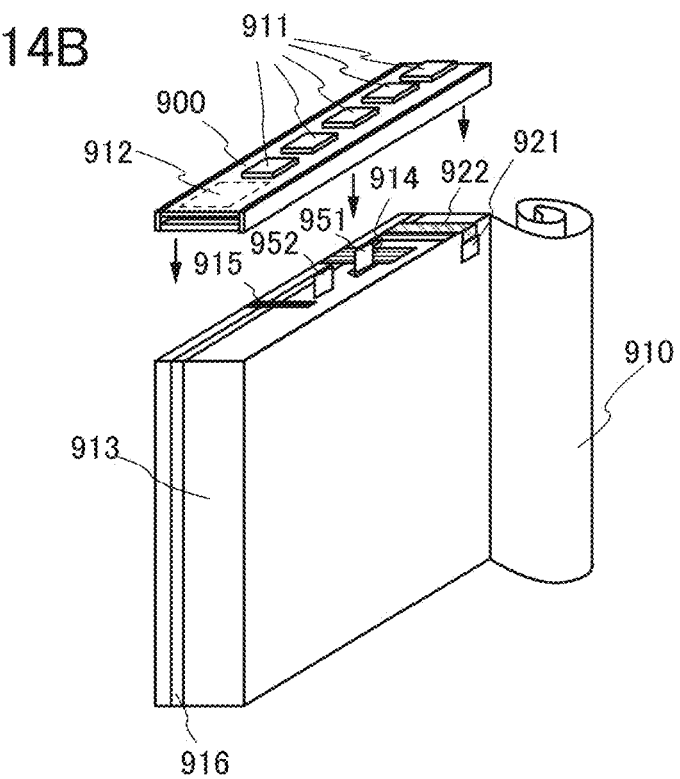

Alternatively, as illustrated in FIG. 14B, the power storage unit 913 in FIGS. 12A and 12B may be provided with a sensor 921. The sensor 921 is electrically connected to the terminal 911 via a terminal 922. Note that the sensor 921 may be provided between the power storage unit 913 and the label 910. Note that description on the power storage device shown in FIGS. 12A and 12B can be referred to for portions similar to those in FIGS. 12A and 12B, as appropriate.

As the sensor 921, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage device is placed can be detected and stored in a memory inside the circuit 912.

FIGS. 15A to 15E illustrate examples of electronic devices including flexible storage batteries illustrated in FIGS. 9A and 9B, FIGS. 10A to 10C, and FIGS. 11A to 11C. Examples of an electronic device including a flexible power storage device include television devices (also referred to as televisions or television receivers), monitors of computers or the like, cameras such as digital cameras or digital video cameras, digital photo frames, mobile phones (also referred to as mobile phones or mobile phone devices), portable game machines, portable information terminals, audio reproducing devices, large game machines such as pachinko machines, and the like.

In addition, a flexible power storage device can be incorporated along a curved inside/outside wall surface of a house or a building or a curved interior/exterior surface of a car.

Figure 15A:
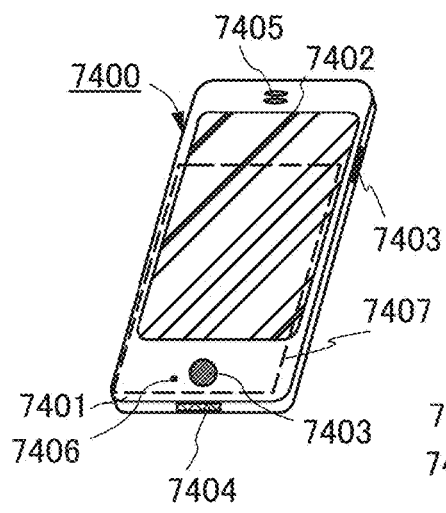
FIGS. 15A to 15E each illustrate an electronic device including a flexible secondary battery of one embodiment of the present invention.

FIG. 15A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 15B:
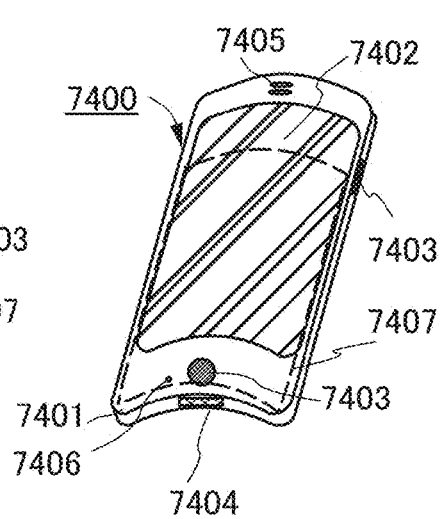
Figure 15C:
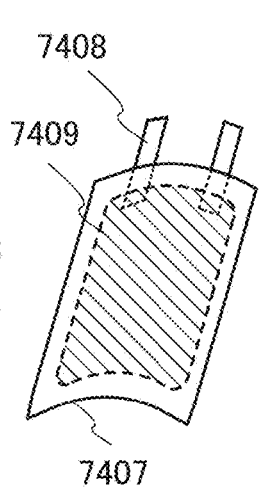

The mobile phone 7400 illustrated in FIG. 15B is bent. When the whole mobile phone 7400 is bent by the external force, the power storage device 7407 included in the mobile phone 7400 is also bent. FIG. 15C illustrates the bent power storage device 7407. The power storage device 7407 is a laminated storage battery. The power storage device 7407 is fixed in a state of being bent. Note that the power storage device 7407 includes a lead electrode 7408 electrically connected to a current collector 7409. The current collector 7409 is, for example, a metal foil containing copper as its main component, and partly alloyed with gallium; thus, adhesion between the current collector 7409 and an active material layer in contact with the current collector 7409 is improved and the power storage device 7407 can have high reliability even in a state of being bent.

Figure 15D:
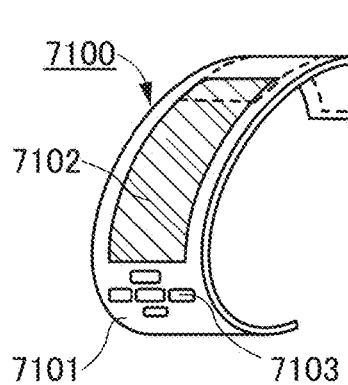
Figure 15E:
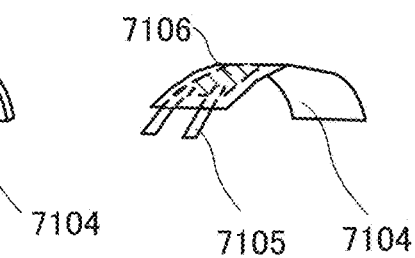

FIG. 15D illustrates an example of a bangle display device. A portable display device 7100 includes a housing 7101, a display portion 7102, an operation button 7103, and a power storage device 7104. FIG. 15E illustrates the bent power storage device 7104. When a user wears the power storage device 7104 in a state of being bent on the wrist, a housing of the power storage device 7104 is deformed and the curvature thereof is partly or entirely changed. When a secondary battery in which an electrolyte solution is held between two films functioning as an exterior body is bent, a radius of curvature of a first film is smaller than that of a second film. In addition, in the secondary battery, a status of a surface of the first film is different from that of the second film. When the secondary battery is curved and has an arc-shaped cross section, compressive stress is applied to a surface of the first film close to the center of curvature and tensile stress is applied to a surface of the second film far from the center of curvature. When the curved surface of the secondary battery has a shape with a plurality of centers of curvature, the secondary battery can be deformed as long as a surface of one of two exterior bodies (the one closer to the center of curvature) has a curvature radius of greater than or equal to 10 mm, preferably greater than or equal to 30 mm in a curved surface having the smallest radius of curvature among the radiuses of curvature of the centers. Note that the power storage device 7104 includes a lead electrode 7105 electrically connected to a current collector 7106. The current collector 7106 is, for example, a metal foil containing copper as its main component, and partly alloyed with gallium; thus, adhesion between the current collector 7106 and an active material layer in contact with the current collector 7106 is improved and the power storage device 7104 can have high reliability even when the power storage device 7104 is bent and its curvature is changed many times.

The use of storage batteries in vehicles can lead to next-generation clean energy vehicles such as hybrid electric vehicles (HEVs), electric vehicles (EVs), and plug-in hybrid electric vehicles (PHEVs).

Figure 16A:
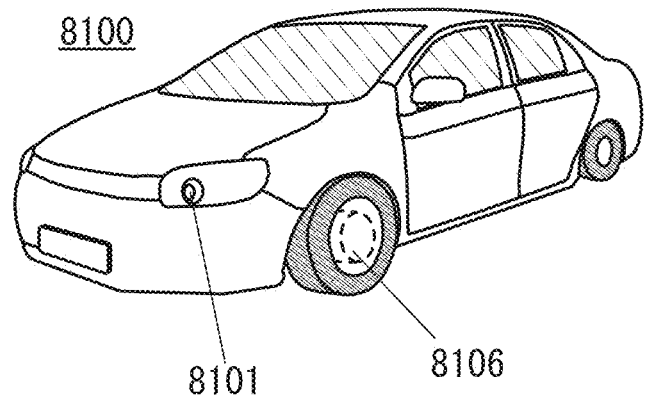
FIGS. 16A and 16B each illustrate a vehicle including a secondary battery of one embodiment of the present invention.
Figure 16B:
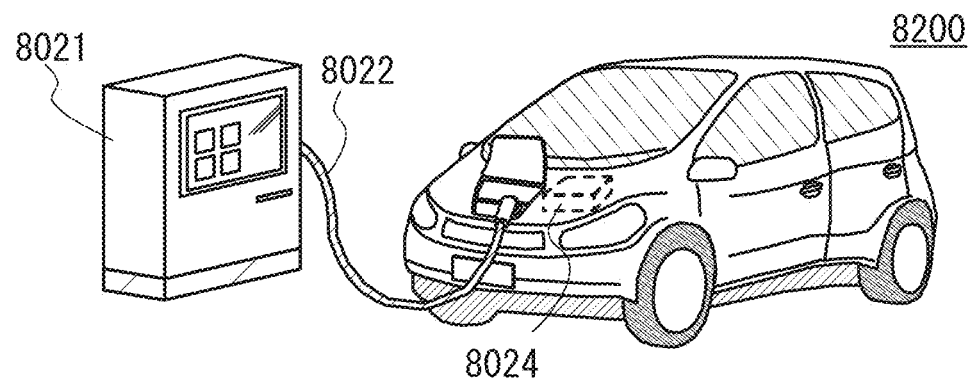

FIGS. 16A and 16B each illustrate an example of a vehicle using one embodiment of the present invention. An automobile 8100 illustrated in FIG. 16A is an electric vehicle which runs on the power of the electric motor. Alternatively, the automobile 8100 is a hybrid electric vehicle capable of driving using either the electric motor or the engine as appropriate. One embodiment of the present invention achieves a high-mileage vehicle. The automobile 8100 includes the power storage device. The power storage device is used not only for driving an electric motor 8106, but also for supplying electric power to a light-emitting device such as a headlight 8101 or a room light (not illustrated).

The power storage device can also supply electric power to a display device included in the automobile 8100, such as a speedometer or a tachometer. Furthermore, the power storage device can supply electric power to a semiconductor device included in the automobile 8100, such as a navigation system.

FIG. 16B illustrates an automobile 8200 including the power storage device 8024. The automobile 8200 can be charged when the power storage device 8024 is supplied with electric power through external charging equipment by a plug-in system, a contactless power supply system, or the like. In FIG. 16B, the power storage device 8024 included in the automobile 8200 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. For example, with the use of a plug-in technique, a power storage device 8024 included in the automobile 8200 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the automobile stops but also when moves. In addition, the contactless power supply system may be utilized to perform transmission/reception between two vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Further, the power storage device included in the vehicle can be used as a power source for supplying electric power to products other than the vehicle. In that case, the use of a commercial power supply can be avoided at peak time of electric power demand.

At least part of this embodiment can be implemented in combination with any of the other embodiments described in this specification as appropriate.

EXAMPLE 1

In this example, a negative electrode of one embodiment of the present invention and a secondary battery including the negative electrode were fabricated.

[Fabrication of Sample]

Powdery gallium, copper flake, VGCF, and a resin (PVDF) were mixed such that the weight ratio thereof was 85:5:5:5. This mixture was kneaded with a planetary kneading machine at 2000 rpm for 5 minutes, NMP (N-methylpyrrolidone) was added thereto, and further mixed for 15 minutes, so that a first slurry is formed. Then, the first slurry was applied to a metal foil containing copper as its main component that is the current collector, kept at 50° C. for 2 hours to vaporize the solvent, and kept at 120° C. for 10 hours.

VGCF and PVDF, which were separately prepared from the above, were mixed such that the weight ratio thereof was 1:1. This mixture was kneaded with a planetary kneading machine at 2000 rpm for 5 minutes, NMP (N-methylpyrrolidone) was added thereto, and further mixed for 15 minutes, so that a second slurry was formed.

On the current collector on which the first slurry was applied and heat treatment was performed, the second slurry was applied. The current collector was kept at 50° C. for 2 hours, so that a covering layer was formed.

Through the above steps, the sample of this example was fabricated. As a comparative example, a sample in which the covering layer is not formed was fabricated by the same method.

[Observed Cross-Sectional Image]

Figure 17A:
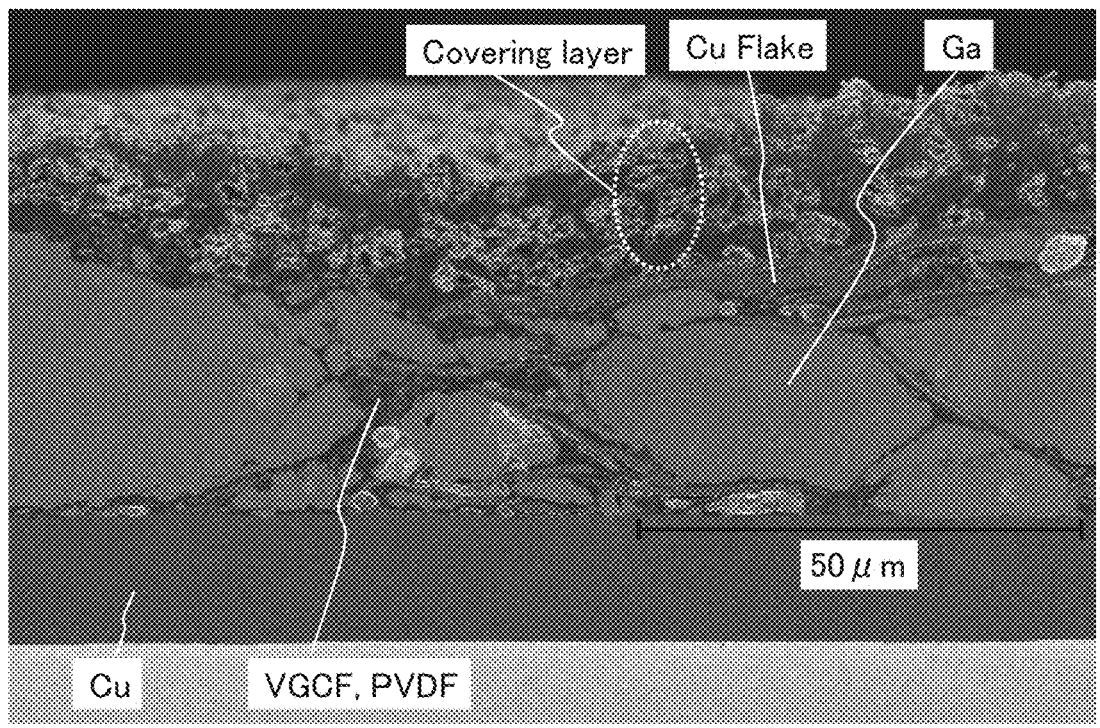
FIGS. 17A and 17B are SEM images of cross sections of samples.

Cross sections of the sample of this example and the comparative sample were observed with a SEM. FIG. 17A is an observed cross-sectional image of the sample of this example, and FIG. 17B is an observed cross-sectional image of the comparative sample.

From FIG. 17A, it is found that gallium (Ga) that is a negative electrode active material is in contact with an upper surface of the metal foil containing copper (Cu) as its main component that is a current collector, and part of gallium is in contact with a Cu flake. By cross-linking by PVDF that is a binder, net-like VGCF is in contact with gallium. Furthermore, an upper surface of gallium is covered with a mixture of VGCF and PVDF which is a covering layer. The thickness of the covering layer, which is different depending on a portion, is approximately 14 μm to 20 μm.

Figure 17B:
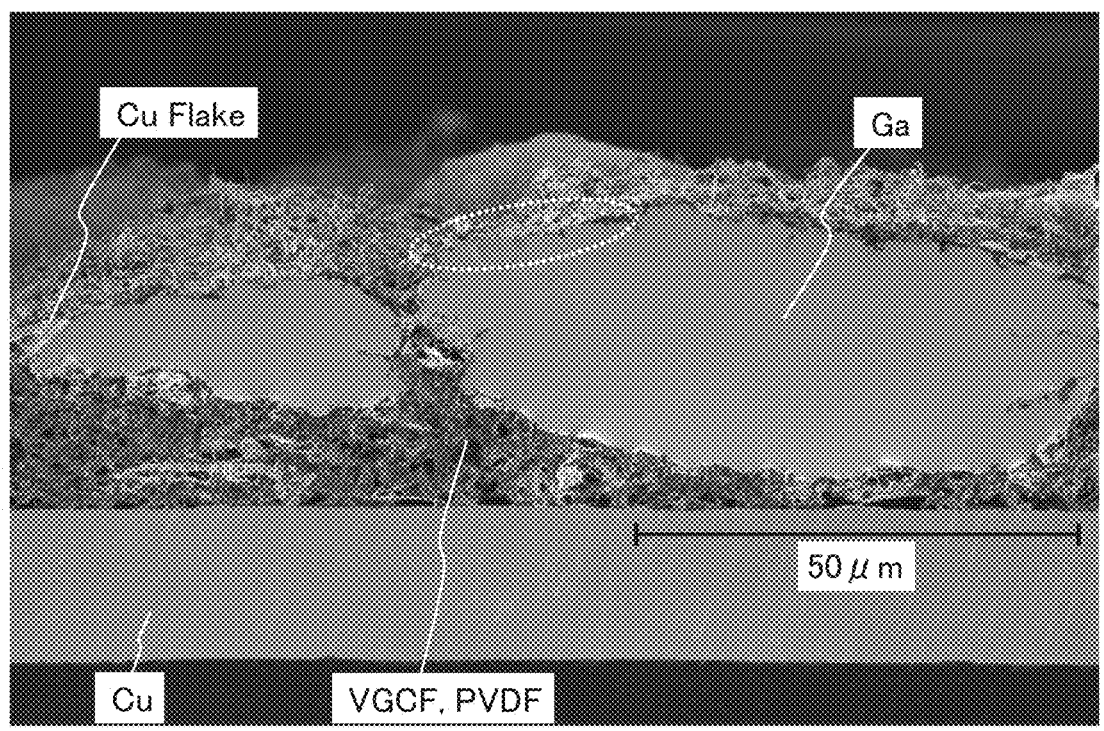

In FIG. 17B, the surface of gallium is not completely covered with the mixture of VGCF and PVDF. For example, gallium is partly exposed in the region surrounded by dotted line in FIG. 17B. Note that top surfaces in the depth direction can be seen in FIGS. 17A and 17B, and the region surrounded by the dotted line shows the surface of the mixture of VGCF and PVDF in the depth direction.

[Observation of Electrode Surface After Charged and Discharged]

A half cell including the sample of this example and a half cell including the comparative sample were fabricated. A surface of each electrode was observed with a SEM just after carrier ions were inserted into an active material and after the carrier ions were released.

In each half cell, metal lithium was used for the other electrode. As an electrolyte solution, a 1 M lithium hexafluorophosphate ($LiPF_6$) solution was used. As a solvent of the electrolyte solution, a mixed solvent in which ethylene carbonate (EC) and diethyl carbonate (DEC) were mixed at a volume ratio of 1:1 was used. As a separator, polypropylene (PP) was used. In the evaluation of charge and discharge using each half cell, metal lithium was used as a negative electrode; thus, the sample of this example or the comparative sample functions as a positive electrode. Therefore, insertion and release of carrier ions in the sample of this example or the comparative sample are opposite to those in a full cell.

Figure 18C:
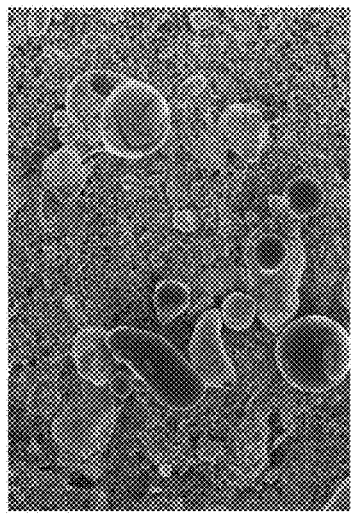
FIGS. 18A to 18F are SEM images of plan views of the samples.
Figure 18F:
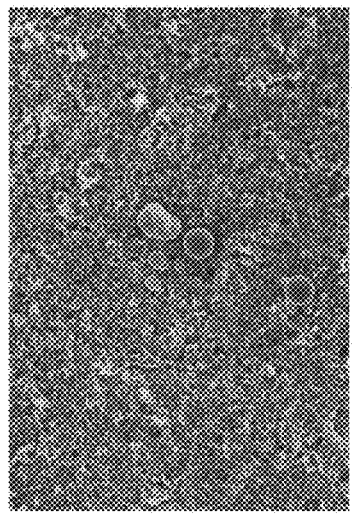
Figure 18B:
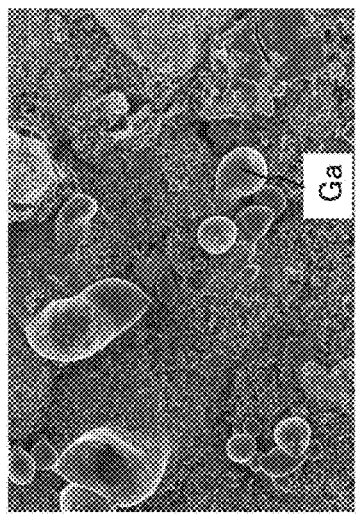
Figure 18E:
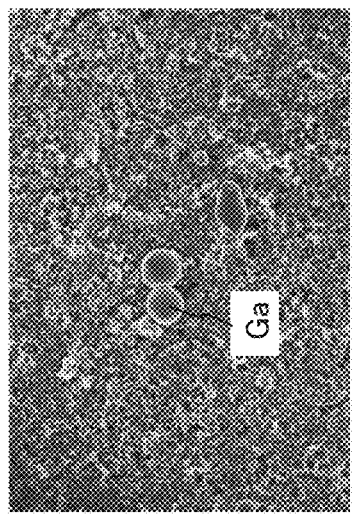
Figure 18A:
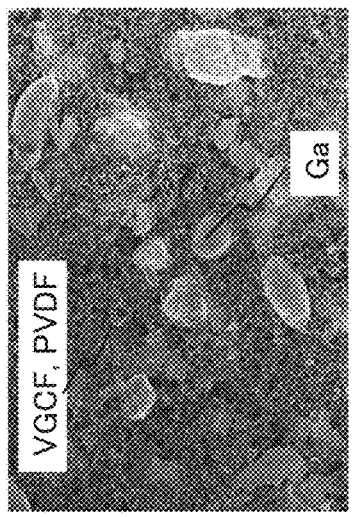

FIGS. 18A, 18B, and 18C are SEM images of the observed electrode surface of the comparative sample. As shown in FIG. 18A, a surface of gallium is exposed from the mixture of VGCF and PVDF before charge and discharge are performed. After discharge (lithium insertion) is performed, gallium (or a gallium-lithium alloy) expands to project from the surface of the mixture of VGCF and PVDF, as shown in FIG. 18B. After charge (lithium extraction) is performed, gallium (or a gallium-lithium alloy) that precipitates at the surface of the mixture of VGCF and PVDF remains and does not contract nor disappear, as shown in FIG. 18C.

Figure 18D:
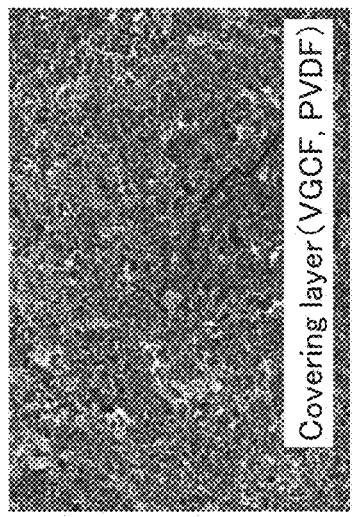

FIGS. 18D, 18E, and 18F are SEM images of the observed electrode surface of the sample of this example. As shown in FIG. 18D, gallium is not observed on the surface before charge and discharge are performed, and the upper surface of gallium is covered with the mixture of VGCF and PVDF which is a covering layer. Furthermore, as shown in FIG. 18E, after discharge (lithium insertion) is performed, gallium (or a gallium-lithium alloy) projecting from a top surface of the covering layer is observed in some degree; however, the proportion thereof is greatly reduced and the size of projecting gallium is small as compared with the comparative sample. Similarly, after charge (lithium extraction) is performed, the proportion of projecting gallium is markedly reduced as compared with the comparative sample, as shown in FIG. 18F.

Note that in the sample of this example, most of gallium projecting from the upper surface of the covering layer can be probably prevented by optimization of the density or thickness of the covering layer.

[Evaluation of Cycle Characteristics]

A full cell using the sample of this example as a negative electrode and a full cell using the comparative sample as a negative electrode were fabricated, and charge-discharge cycle characteristics of these cells were evaluated.

The cells used for the evaluation were laminated cells. As the electrolyte solution, a 1 M lithium hexafluorophosphate ($LiPF_6$) solution was used. Note that as a solvent of the electrolyte solution, a mixed solvent in which ethylene carbonate (EC) and diethyl carbonate (DEC) were mixed at a volume ratio of 1:1 was used. As the separator, polypropylene (PP) was used. Charge and discharge in the first cycle were performed at a rate of 0.1 C (it takes 10 hours for charging and 10 hours for discharging), and charge and discharge in the second and the subsequent cycles were performed at a rate of 0.2 C (it takes 5 hours for charging and 5 hours for discharging). Note that in this specification and the like, a charging rate C refers to the rate at which a secondary battery is charged. For example, the charge rate in the case of charging a battery having a capacity of 1 Ah with 1 A is 1 C. A discharge rate C refers to the rate at which a battery is discharged. For example, the discharge rate in the case of discharging a battery having a capacity of 1 Ah with 1 A is 1 C. All charges and discharges were performed at constant current, voltages ranging from 2 V to 4.6 V, and an environment temperature of 25° C.

Figure 19:
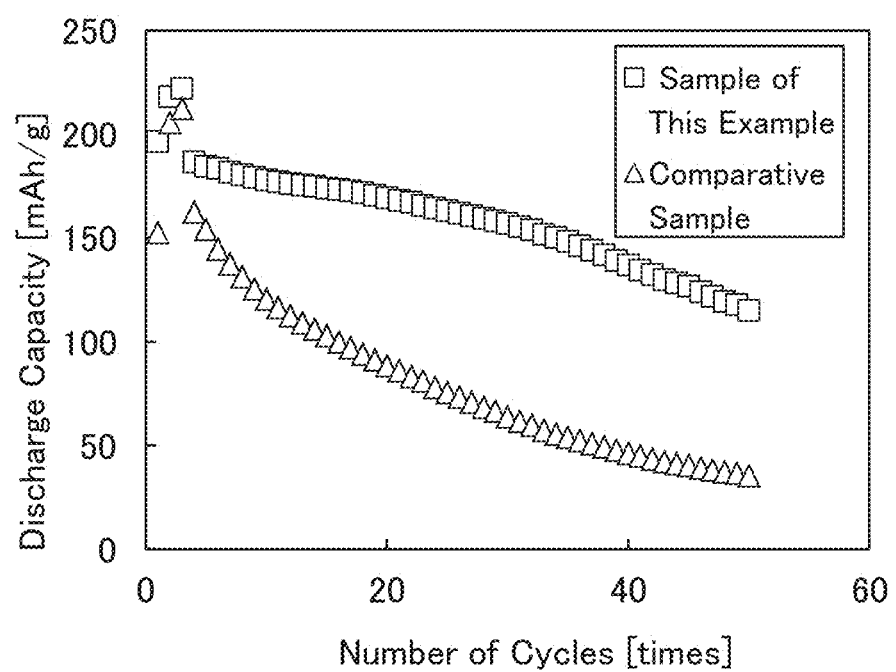
FIG. 19 is a graph showing the cycle characteristics of the samples.

FIG. 19 shows the measurement results of the cycle characteristics. The horizontal axis represents the number of cycles (times) and the vertical axis represents discharge capacity (mAh/g) of the secondary batteries. In FIG. 19, cycle characteristics of a secondary battery using the sample of this example are indicated by squares and cycle characteristics of a secondary battery using the comparative sample are indicated by triangles.

FIG. 19 shows that in the sample of this example, decrement of the discharge capacity versus the number of circles is small as compared with the comparative sample. That is, deterioration of cycle characteristics can be suppressed in the secondary battery using the sample of this example as compared with the secondary battery using the comparative sample.

As described above, a decrease in discharge capacity caused by part of the negative electrode active material (which is separated during charge and discharge and which does not contribute to charge and discharge) is suppressed by providing a covering layer that covers a top surface of the negative electrode active material; accordingly, the charge-discharge cycle characteristics can be improved.

EXAMPLE 2

In this example, a negative electrode of one embodiment of the present invention and a secondary battery including the negative electrode were fabricated.

First, a procedure of forming the negative electrode 100 containing gallium is described as an example.

A slurry in which powdery gallium is mixed in a solvent or a resin is applied to the current collector 101. In this example, a metal foil containing copper as its main component was used as the current collector, and the ratio of gallium, spherical graphite, VGCF, and a resin (poly(vinylidene fluoride), PVDF) was 85:5:5:5.

Although VGCF was used as a fiber conductive additive in this example, a particle conductive additive may be used. The typical values of the used VGCF are as follows: the fiber diameter is 150 nm; the fiber length is 10 µm or greater and 20 µm or less; the real density is 2 g/cm$^3$; and specific surface area is 13 m$^2$/g. An example of the particle conductive additive is carbon black. Carbon black such as acetylene black or ketjen black is a fine particle with a diameter of 3 nm or greater and 500 nm or less. In this example, a VGCF 104 was mixed into the slurry.

Next, to vaporize a solvent, first heat treatment was performed at 50° C., and then second heat treatment was performed. The second heat treatment may be performed in a range of 100° C. to 300° C., for example, the second heat treatment may be performed at 120° C. for 10 hours. By the heat treatment, the current collector (copper) and gallium were in contact with each other to form an alloy.

Figure 20A:
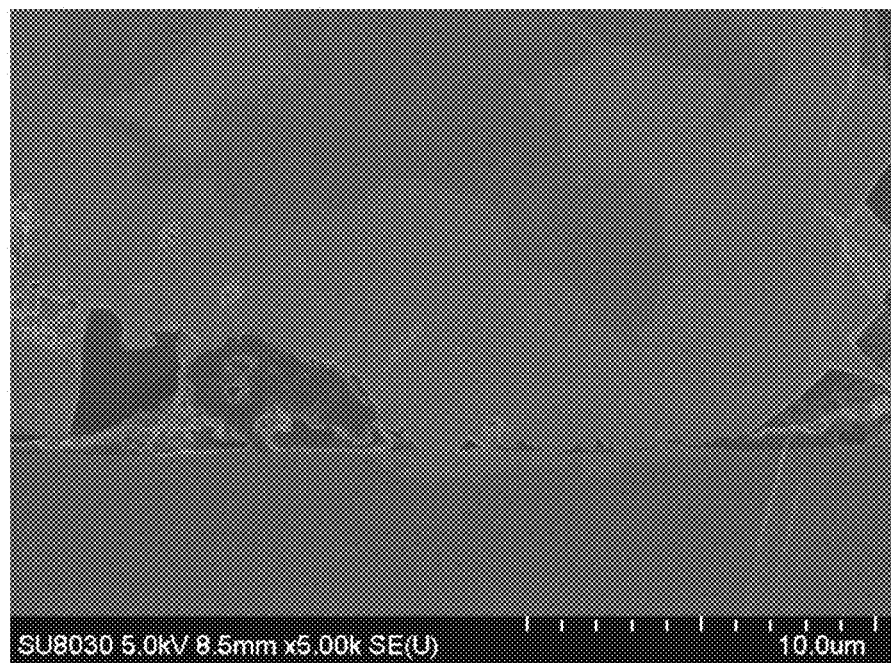
FIGS. 20A and 20B are a SEM image and a schematic view, respectively, of a cross section of one embodiment of the present invention.
Figure 20B:
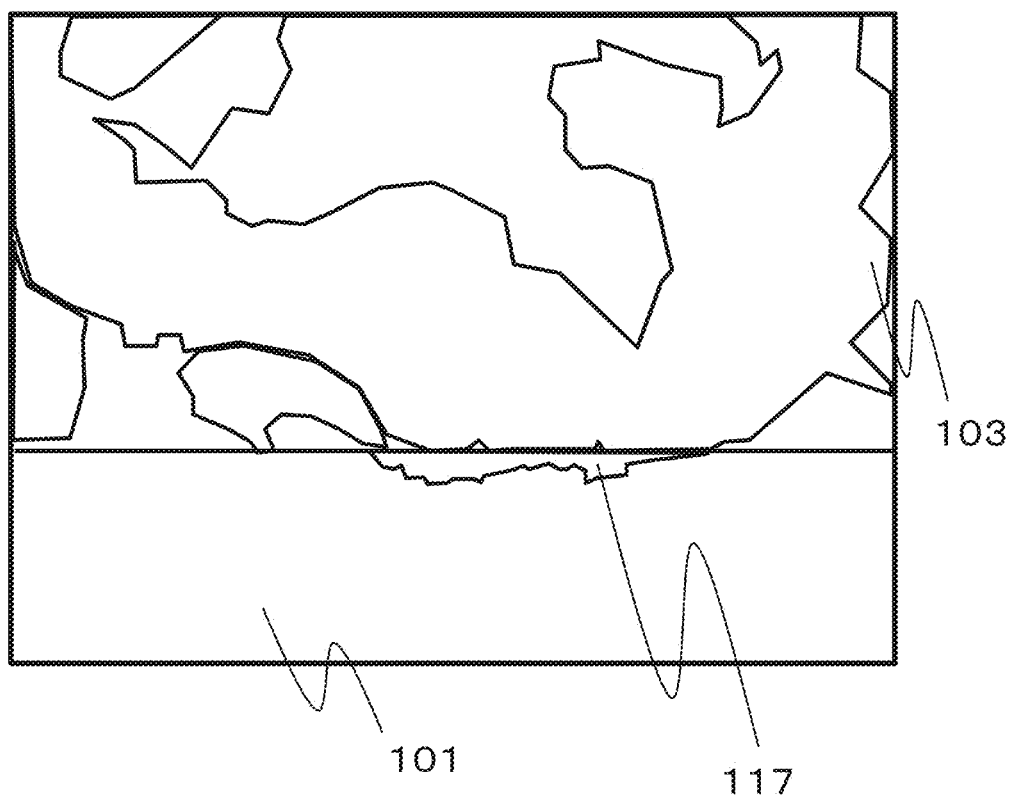
Figure 21A:
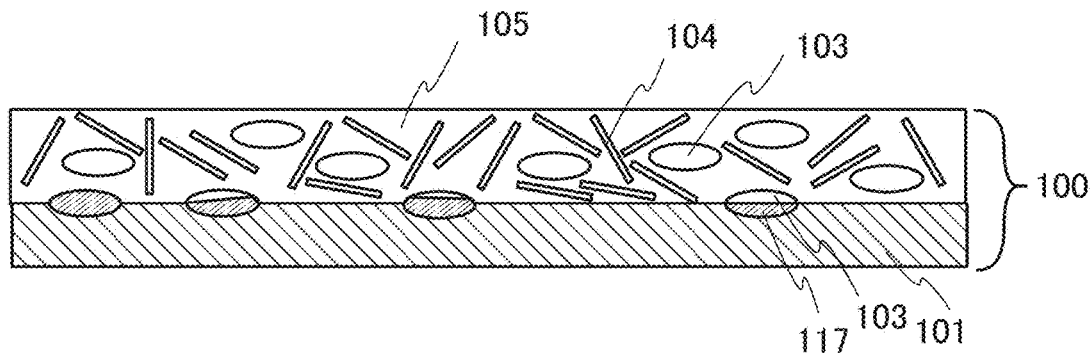
FIGS. 21A to 21C are schematic views each illustrating a cross section of a negative electrode of one embodiment of the present invention.

FIG. 20A is a SEM image of a cross section of a current collector interface in the sample fabricated in the above-described manner. FIG. 20B is a schematic view thereof. FIG. 21A is a schematic cross-sectional view illustrating the sample.

Part of the current collector 101 becomes an alloy 117, and a gallium 103 is fixed by the alloy 117. When the alloy 117 is subjected to XRD measurement, existence of CuGa$_2$ can be confirmed. Moreover, a layer 105 containing a resin is formed over the current collector 101.

Although FIG. 21A shows an example where part of the current collector is alloyed to be the alloy 117, one embodiment of the present invention is not limited thereto. For example, when almost the whole gallium that is in contact with the current collector is alloyed, the gallium might become the alloy 117 projecting from a plan surface of the current collector.

Figure 21B:
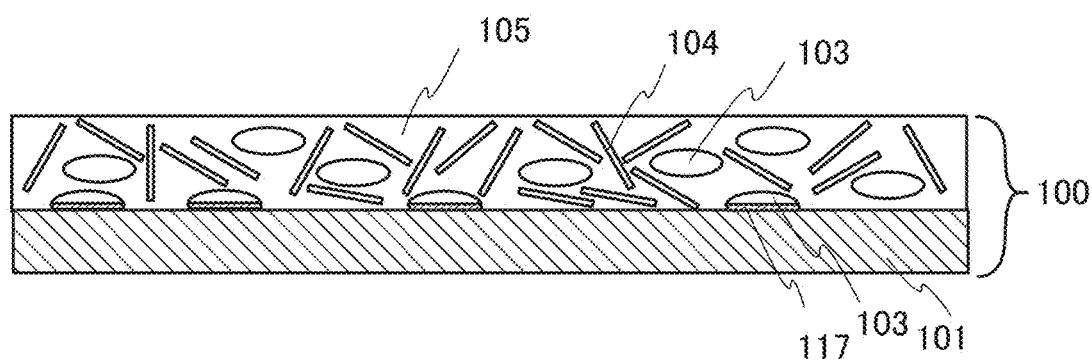

Depending on a material of the current collector or a material of the negative electrode active material, the alloy 117 is positioned over the current collector 101, and the gallium 103 is positioned over the alloy 117, as shown in FIG. 21B.

Figure 21C:
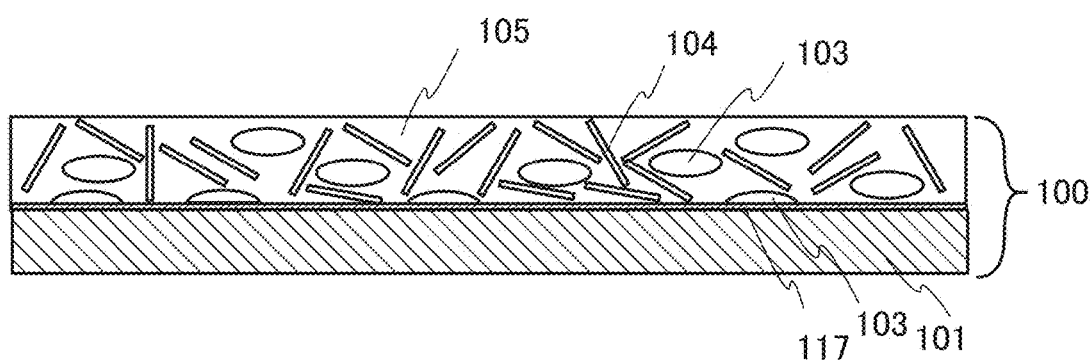

As shown in FIG. 21C, a layer formed of an alloy may be provided between the current collector 101 and the gallium 103.

By alloying gallium and copper near a surface of the current collector, the cycle characteristics of a lithium ion battery can be improved.

Although an example where this sample is used for a battery is described in this example, application of this sample is not limited to this. For example, this sample can be used for a capacitor. For example, this sample can be used for a lithium ion capacitor in which a negative electrode of a lithium ion secondary battery and a positive electrode of an electric double layer are used in combination.

This example can be implemented in combination with any of the embodiments and the other examples as appropriate.

EXAMPLE 3

In this example, described is an example of forming a negative electrode with the use of slurry in which a copper flake, VGCF, and powdery gallium are mixed in a solvent and a resin.

The slurry in which a copper flake, VGCF, and powdery gallium were mixed in a solvent and a resin was applied to the current collector 101. In this example, a metal foil containing copper as its main component was used as the current collector, and a mix ratio of gallium to the copper flake, VGCF, and the resin (PVDF) was 85:5:5:5.

Next, to vaporize a solvent, first heat treatment was performed at 50° C., and then second heat treatment was performed. The second heat treatment may be performed in a range of 100° C. to 300° C., for example, the second heat treatment may be performed at 120° C. for 10 hours. By the first heat treatment, a solvent is vaporized and the layer 105 containing resin is formed. Furthermore, by the second heat treatment, the copper flake and gallium were in contact with each other to form a first alloy, and the current collector (copper) and gallium were in contact with each other to form a second alloy.

Figure 22A:
FIGS. 22A and 22B are a SEM image and a schematic view, respectively, of a cross section of one embodiment of the present invention.
Figure 22B:
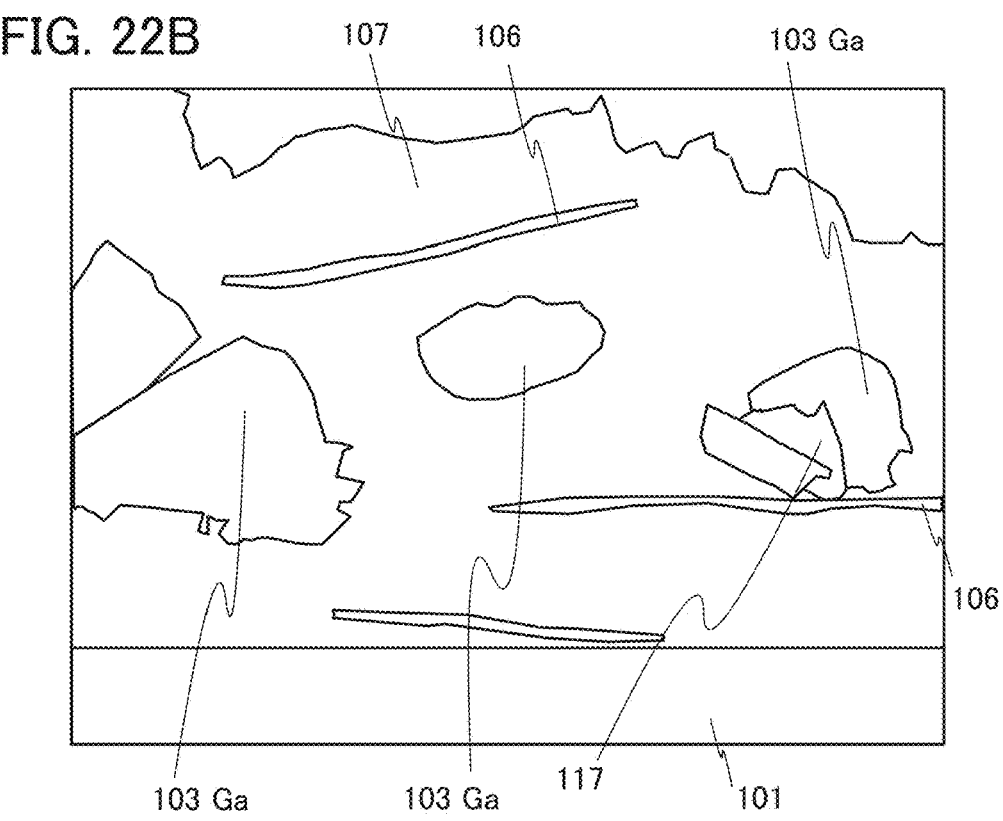
Figure 23A:
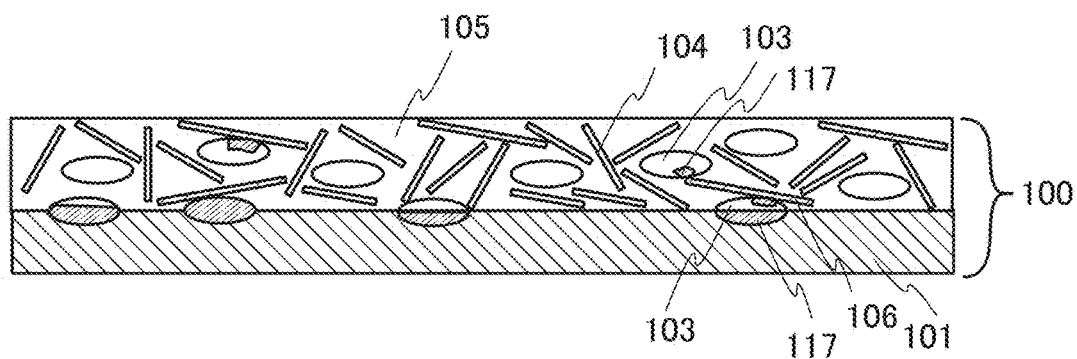
FIGS. 23A and 23B are schematic views each illustrating a cross section of a negative electrode of one embodiment of the present invention.

FIG. 22A is a SEM image of a cross section of a current collector interface in the sample fabricated in the above-described manner. FIG. 22B is a schematic view thereof. FIG. 23A is a schematic cross-sectional view illustrating the sample.

In FIG. 22A, a copper flake 106 and gallium are in contact with each other to form the alloy 117. A structure body 107 formed of a resin (PVDF) and VGCF includes the copper flake 106, the alloy 117, and the gallium 103, and the positions thereof are fixed by the structure body 107.

Although not shown in FIGS. 22A and 22B, part of the current collector 101 might become the alloy 117 in some area, as shown in FIG. 23A. The copper flake 106 is also called flake copper powder, and coated with an organic compound that is in a solid powder state at normal temperature. The amount of the organic compound in a solid powder state with respect to the copper flake is greater than or equal to 0.01% and less than or equal to 5%. The organic compound in a solid powder state is formed with one or more selected from a stearic acid, a myristic acid, a citric acid, a glutaric acid, a palmitic acid, and a maleic acid. In this example, copper flake with a size of approximately 45 μm, a copper purity of 97% or higher, an iron content of 0.05% or lower, and a stearic acid being added at approximately 2% to avoid dust explosion was used. Since the melting point of a stearic acid is 115° C. or higher and 120° C. or lower, the heat treatment temperature for alloying gallium and the copper flake is preferably higher than 120° C.

Figure 23B:
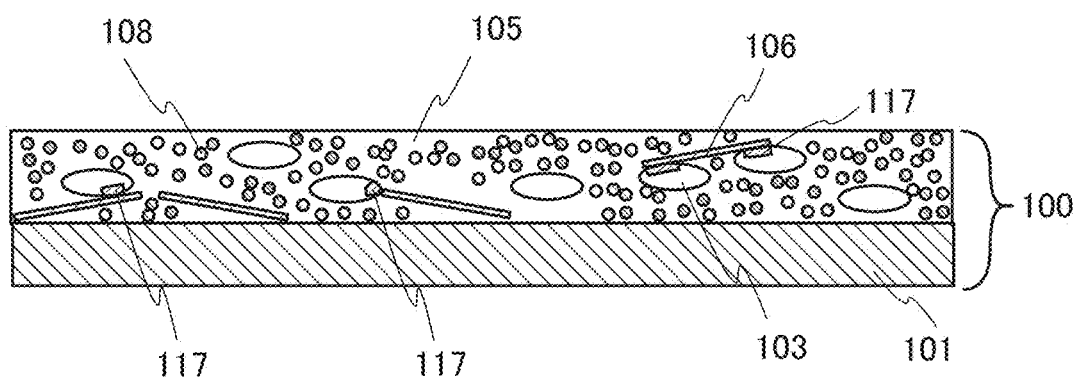

Although FIG. 23A illustrates an example where the VGCF 104 that is a fiber conductive additive is used, one embodiment of the present invention is not limited thereto. As illustrated in FIG. 23B, an acetylene black 108 that is a particle conductive additive may be used instead of VGCF. In this example, an acetylene black with an average particle diameter of 35 nm and a specific surface area of 68 m²/g can be used, for example.

As described above, a negative electrode in which copper and gallium are alloyed was formed, and combined with a positive electrode to form a full cell. The thus formed secondary battery was charged and discharged once. Next, the cycle characteristics of the secondary battery were measured.

The cells used for the evaluation were laminated cells. As the electrolyte solution, a 1 M lithium hexafluorophosphate (LiPF$_6$) solution was used. Note that as a solvent of the electrolyte solution, a mixed solvent in which ethylene carbonate (EC) and diethyl carbonate (DEC) were mixed at a volume ratio of 1:1 was used. As the separator, polypropylene (PP) was used. Charge and discharge in the first cycle were performed at a rate of 0.1 C (it takes 10 hours for charging and 10 hours for discharging), and charge and discharge in the second and the subsequent cycles were performed at a rate of 0.2 C (it takes 5 hours for charging and 5 hours for discharging). Note that 1 C means the amount of current per unit weight for fully charging a battery (each of the evaluation cells, here) in an hour. All charges and discharges were performed at constant current, voltages ranging from 2 V to 4.6 V, and an environment temperature of 25° C.

The evaluation of cycle characteristics were performed on a full cell including a negative electrode in which copper flake is contained and gallium and copper are alloyed and a comparative full cell including a negative electrode which does not contain copper flake and is not subjected to heat treatment for alloying copper and gallium. Note that positive electrodes in the both full cells are formed under the same conditions.

Figure 24:
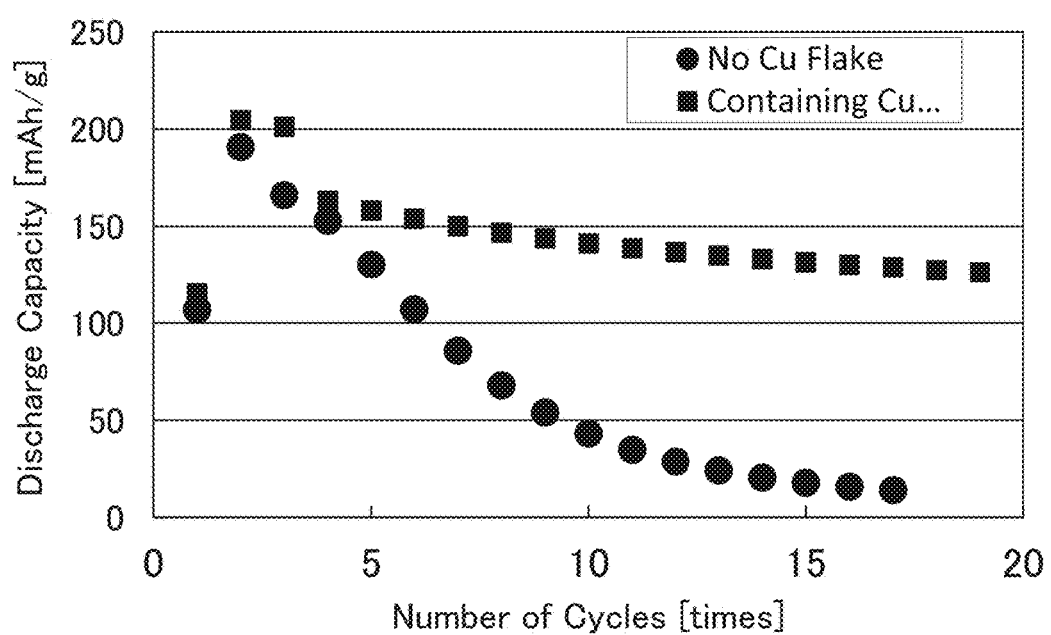
FIG. 24 is a graph showing the cycle characteristics.

FIG. 24 shows the measurement results of the cycle characteristics. The horizontal axis represents the number of cycles (times) and the vertical axis represents discharge capacity (mAh/g) of the secondary batteries. In FIG. 24, the cycle characteristics of the full cell that includes the negative electrode in which copper flake is contained and gallium and copper are alloyed are indicated by squares; the cycle characteristics of the comparative example which does not contain copper flake and is not subjected to heat treatment for alloying copper and gallium are indicated by circles.

According to the results, as shown by the circles, the discharge capacity of the comparative full cell decreases as the number of circles increases. That is, deterioration is significant.

In contrast, as shown by the squares, the discharge capacity is decreased also in the secondary battery in which Ga is used for a negative electrode active material, but drastic decrease in discharge capacity is not observed as compared with the comparative full cell, and deterioration is sufficiently suppressed. Thus, improvement in cycle characteristics by alloying gallium and copper is verified.

(Evaluation)

Therefore, the cycle characteristics of a lithium ion battery, which deteriorates as charge and discharge are repeated, can be improved by alloying gallium and copper.

This example can be implemented in combination with any of the embodiments and the other examples as appropriate.

This application is based on Japanese Patent Application serial no. 2013-200013 filed with Japan Patent Office on Sep. 26, 2013 and Japanese Patent Application serial no. 2013-211589 filed with Japan Patent Office on Oct. 9, 2013, the entire contents of which are hereby incorporated by reference.

What is claimed is:

1. A secondary battery comprising:
    a positive electrode;
    a negative electrode comprising:
        a current collector comprising a first metal element;
        a negative electrode active material layer on the current collector, the negative electrode active material layer comprising gallium, a binder, and a fiber conductive material dispersed in the binder; and
        a covering layer on the negative electrode active material layer, the covering layer comprising a resin and the fiber conductive material; and
    a separator provided between the positive electrode and the negative electrode,
    wherein the covering layer is configured to cover a surface of gallium which is not covered with the binder, and
    wherein a thickness of the negative electrode active material layer is larger than a thickness of the covering layer.

2. The secondary battery according to claim 1, wherein the fiber conductive material comprises a vapor-grown carbon fiber.

3. The secondary battery according to claim 1,
    wherein the negative electrode further comprises a first alloy being in contact with both the current collector and gallium included in the negative electrode active material layer, and
    wherein the first alloy contains the first metal element contained in the current collector and gallium.

4. The secondary battery according to claim 1, wherein the current collector comprises copper.

5. The secondary battery according to claim 1, wherein the negative electrode active material layer further comprises a metal flake dispersed in the binder.

6. The secondary battery according to claim 5, wherein the metal flake comprises copper.

7. The secondary battery according to claim 5, wherein the negative electrode further comprises a second alloy being in contact with both the metal flake and gallium.

8. A secondary battery comprising:
a positive electrode;
a negative electrode comprising:
- a current collector comprising copper;
- a negative electrode active material layer on the current collector, the negative electrode active material layer comprising gallium, a binder, and a vapor-grown carbon fiber dispersed in the binder; and
- a covering layer on the negative electrode active material layer, the covering layer comprising a resin and the vapor-grown carbon fiber; and a separator provided between the positive electrode and the negative electrode,
wherein the covering layer is configured to cover a surface of gallium which is exposed from a surface of the binder, and
wherein a thickness of the negative electrode active material layer is larger than a thickness of the covering layer.

9. The secondary battery according to claim 8,
wherein the negative electrode further comprises a first alloy being in contact with both the current collector and gallium in the negative electrode active material layer, and
wherein the first alloy contains copper and gallium.

10. The secondary battery according to claim 8, wherein the negative electrode active material layer further comprises a metal flake dispersed in the binder.

11. The secondary battery according to claim 10, wherein the negative electrode further comprises a second alloy being in contact with both the metal flake and gallium in the negative electrode active material layer.

12. The secondary battery according to claim 10, wherein the metal flake comprises copper.

13. A secondary battery comprising:
a positive electrode;
a negative electrode comprising:
- a current collector comprising a first metal element;
- a negative electrode active material layer on the current collector, the negative electrode active material layer comprising gallium, a binder, and a vapor-grown carbon fiber dispersed in the binder;
- a first alloy provided between and in contact with the current collector and gallium; and
- a covering layer on the negative electrode active material layer, the covering layer comprising a resin and the vapor-grown carbon fiber; and a separator provided between the positive electrode and the negative electrode,
wherein the covering layer is configured to cover a surface of gallium which projects from a surface of the binder,
wherein the first alloy comprises the first metal element and gallium, and
wherein a thickness of the negative electrode active material layer is larger than a thickness of the covering layer.

14. The secondary battery according to claim 13, wherein the current collector comprises copper.

15. The secondary battery according to claim 13, wherein the negative electrode active material layer further comprises a metal flake dispersed in the binder.

16. The secondary battery according to claim 15, wherein the negative electrode further comprises a second alloy being in contact with both the metal flake and gallium in the negative electrode active material layer.

17. The secondary battery according to claim 15, wherein the metal flake comprises copper.

18. The secondary battery according to claim 1, wherein the resin comprises polyvinylidene fluoride.

19. The secondary battery according to claim 8, the resin comprises polyvinylidene fluoride.

20. The secondary battery according to claim 19, wherein the thickness of the covering layer is 14 µm or more.

21. The secondary battery according to claim 13, wherein the resin comprises polyvinylidene fluoride.

22. The secondary battery according to claim 21, wherein the thickness of the covering layer is 14 µm or more.

* * * * *